(12) United States Patent
Sthaneshwar et al.

(10) Patent No.: US 12,551,795 B2
(45) Date of Patent: Feb. 17, 2026

(54) AUTOMATED PERSONALIZED VIDEO GAME GUIDANCE SYSTEM

(71) Applicant: Electronic Arts Inc., Redwood City, CA (US)

(72) Inventors: Siddharth Mysore Sthaneshwar, San Mateo, CA (US); Yunqi Zhao, Sunnyvale, CA (US); Xin Gao, San Francisco, CA (US); Alec Jarred Antrim, Algonquin, IL (US); Harold Henry Chaput, Castro Valley, CA (US); Fernando de Mesentier Silva, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 140 days.

(21) Appl. No.: 18/193,158

(22) Filed: Mar. 30, 2023

(65) Prior Publication Data
US 2024/0325901 A1 Oct. 3, 2024

(51) Int. Cl.
*A63F 13/5375* (2014.01)
*A63F 13/79* (2014.01)
*G06N 3/092* (2023.01)

(52) U.S. Cl.
CPC .......... *A63F 13/5375* (2014.09); *A63F 13/79* (2014.09); *G06N 3/092* (2023.01)

(58) Field of Classification Search
CPC ...... A63F 13/5375; A63F 13/79; A63F 13/35; A63F 13/67; G06N 3/092; G06N 3/006; G06N 3/045; G06N 3/08; G06N 3/088
(Continued)

(56) References Cited

U.S. PATENT DOCUMENTS

| 5,274,801 A | 12/1993 | Gordon |
| 5,683,082 A | 11/1997 | Takemoto et al. |

(Continued)

FOREIGN PATENT DOCUMENTS

| CN | 104657412 A | 5/2015 |
| CN | 106213306 A | 12/2016 |

(Continued)

OTHER PUBLICATIONS

Aponte et al., "Measuring the level of difficulty in single player video games," Elsevier, Entertainment Computing (2011) 205-213.
(Continued)

*Primary Examiner* — Michael A Cuff
(74) *Attorney, Agent, or Firm* — Knobbe, Martens, Olson & Bear, LLP

(57) ABSTRACT

A device may access a feature vector generated based on interactions by a user with a video game. The device may access a cluster map comprising a mapping of user clusters, wherein each location within the cluster map is associated with a set of users whose feature vectors are within a threshold degree of similarity of each other. The cluster map may be generated using a plurality of extracted feature vectors obtained from interaction information. A device may determine a map location within the cluster map associated with the user based at least in part on the feature vector. A device may determine a target map location within the cluster map. A device may determine a guidance action based at least in part on the target map location and the map location associated with the user. A device may execute the guidance action.

20 Claims, 16 Drawing Sheets

(58) Field of Classification Search
USPC .......................................................... 463/31
See application file for complete search history.

(56) References Cited

U.S. PATENT DOCUMENTS

| | | | |
|---|---|---|---|
| 6,106,395 A | 8/2000 | Begis | |
| 6,253,193 B1 | 6/2001 | Ginter et al. | |
| 6,285,380 B1 | 9/2001 | Perlin | |
| 7,390,254 B2 | 6/2008 | Hirai | |
| 7,636,701 B2 | 12/2009 | Funge et al. | |
| 8,100,770 B2 | 1/2012 | Yamazaki et al. | |
| 8,142,282 B2 | 3/2012 | Canessa et al. | |
| 8,267,764 B1 | 9/2012 | Aoki et al. | |
| 8,398,476 B1 | 3/2013 | Sidhu et al. | |
| 8,540,560 B2 | 9/2013 | Crowley et al. | |
| 8,821,290 B2 | 9/2014 | Fujisawa et al. | |
| 8,907,193 B2 | 12/2014 | Cross et al. | |
| 8,914,251 B2 | 12/2014 | Ohta | |
| 9,001,118 B2 | 4/2015 | Molyneaux et al. | |
| 9,013,489 B2 | 4/2015 | Evertt et al. | |
| 9,033,796 B2 | 5/2015 | Fujisawa et al. | |
| 9,069,441 B2 | 6/2015 | Jacob | |
| 9,461,876 B2* | 10/2016 | Van Dusen | G06Q 30/0201 |
| 9,616,329 B2 | 4/2017 | Szufnara et al. | |
| 9,734,594 B2 | 8/2017 | Auclair et al. | |
| 9,919,217 B2 | 3/2018 | Aghdaie et al. | |
| 9,949,697 B2 | 4/2018 | Iscoe et al. | |
| 10,004,984 B2 | 6/2018 | Voris et al. | |
| 10,105,603 B2 | 10/2018 | Bucher | |
| 10,286,323 B2 | 5/2019 | Aghdaie et al. | |
| 10,357,718 B2 | 7/2019 | Aghdaie et al. | |
| 10,403,001 B2 | 9/2019 | Auclair et al. | |
| 10,478,730 B1 | 11/2019 | Burnett | |
| 10,569,176 B2 | 2/2020 | D'angelo et al. | |
| 10,713,543 B1 | 7/2020 | Skuin et al. | |
| 10,799,798 B2 | 10/2020 | Aghdaie et al. | |
| 10,807,004 B2 | 10/2020 | Aghdaie et al. | |
| 10,839,215 B2 | 11/2020 | Somers et al. | |
| 10,872,345 B1* | 12/2020 | Walters | G06Q 20/4093 |
| 10,940,393 B2 | 3/2021 | Somers et al. | |
| 10,953,334 B2 | 3/2021 | Kolen et al. | |
| 11,110,353 B2 | 9/2021 | Somers et al. | |
| 11,276,216 B2 | 3/2022 | Borovikov et al. | |
| 11,369,880 B2 | 6/2022 | Aghdaie et al. | |
| 11,406,899 B2 | 8/2022 | Kolen et al. | |
| 11,413,539 B2 | 8/2022 | Aghdaie et al. | |
| 11,458,399 B2 | 10/2022 | Aghdaie et al. | |
| 11,532,172 B2 | 12/2022 | Skuin et al. | |
| 11,875,445 B2 | 1/2024 | Keable | |
| 2004/0067788 A1 | 4/2004 | Angelopoulos | |
| 2004/0152512 A1 | 8/2004 | Collodi et al. | |
| 2005/0130725 A1 | 6/2005 | Creamer et al. | |
| 2007/0054717 A1 | 3/2007 | Youm et al. | |
| 2007/0060364 A1 | 3/2007 | Osgood et al. | |
| 2007/0066403 A1 | 3/2007 | Conkwright | |
| 2007/0260567 A1 | 11/2007 | Funge et al. | |
| 2008/0097948 A1 | 4/2008 | Funge et al. | |
| 2008/0266250 A1 | 10/2008 | Jacob | |
| 2008/0268961 A1 | 10/2008 | Brook | |
| 2009/0202114 A1 | 8/2009 | Morin et al. | |
| 2009/0307671 A1 | 12/2009 | White et al. | |
| 2010/0144444 A1 | 6/2010 | Graham | |
| 2010/0302257 A1 | 12/2010 | Perez et al. | |
| 2011/0007079 A1 | 1/2011 | Perez et al. | |
| 2011/0035280 A1 | 2/2011 | Fordyce, III | |
| 2011/0295649 A1 | 12/2011 | Fine et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0233105 A1 | 9/2012 | Cavallaro et al. | |
| 2012/0244941 A1 | 9/2012 | Ostergren et al. | |
| 2012/0276964 A1 | 11/2012 | Jones et al. | |
| 2012/0295708 A1 | 11/2012 | Hernandez et al. | |
| 2012/0309520 A1 | 12/2012 | Evertt et al. | |
| 2013/0178281 A1 | 7/2013 | Ayyar et al. | |
| 2013/0237304 A1* | 9/2013 | Oakes | G07F 17/32 463/16 |
| 2013/0316779 A1 | 11/2013 | Vogel | |
| 2013/0316795 A1 | 11/2013 | Vogel | |
| 2013/0342527 A1 | 12/2013 | Molyneaux et al. | |
| 2014/0169690 A1* | 6/2014 | Miyashita | A63F 13/46 382/225 |
| 2014/0235346 A1 | 8/2014 | Kim et al. | |
| 2014/0249961 A1 | 9/2014 | Zagel et al. | |
| 2014/0274370 A1 | 9/2014 | Shah | |
| 2014/0294361 A1* | 10/2014 | Acharya | G06T 17/00 386/241 |
| 2015/0105161 A1 | 4/2015 | Sumaki et al. | |
| 2015/0111641 A1 | 4/2015 | Timm | |
| 2015/0213646 A1 | 7/2015 | Ma et al. | |
| 2015/0287166 A1 | 10/2015 | Cerny | |
| 2015/0302505 A1 | 10/2015 | Di et al. | |
| 2015/0339532 A1 | 11/2015 | Sharma et al. | |
| 2016/0005270 A1 | 1/2016 | Marr et al. | |
| 2016/0067612 A1 | 3/2016 | Ntoulas et al. | |
| 2017/0061685 A1 | 3/2017 | Auclair et al. | |
| 2017/0064284 A1 | 3/2017 | Auclair | |
| 2017/0124753 A1 | 5/2017 | Arisman | |
| 2017/0259177 A1 | 9/2017 | Aghdaie et al. | |
| 2017/0312634 A1 | 11/2017 | Ledoux et al. | |
| 2017/0316601 A1 | 11/2017 | Kakarlapudi et al. | |
| 2017/0358122 A1 | 12/2017 | Cwik et al. | |
| 2017/0365102 A1 | 12/2017 | Huston et al. | |
| 2018/0001216 A1 | 1/2018 | Bruzzo et al. | |
| 2018/0018894 A1* | 1/2018 | Coulson, Sr. | G09B 9/04 |
| 2018/0082123 A1 | 3/2018 | Katz et al. | |
| 2018/0082467 A1 | 3/2018 | Andersson et al. | |
| 2018/0117465 A1 | 5/2018 | Voris et al. | |
| 2018/0161673 A1 | 6/2018 | Pasternack et al. | |
| 2018/0161682 A1 | 6/2018 | Myhill | |
| 2018/0169526 A1 | 6/2018 | Aghdaie et al. | |
| 2018/0214777 A1* | 8/2018 | Hingorani | A63F 13/5255 |
| 2018/0240268 A1 | 8/2018 | Nevraev | |
| 2018/0243656 A1 | 8/2018 | Aghdaie et al. | |
| 2018/0268652 A1 | 9/2018 | Crittenden | |
| 2018/0349808 A1* | 12/2018 | Sahadi | G06Q 10/047 |
| 2018/0350144 A1* | 12/2018 | Rathod | G06Q 20/3224 |
| 2019/0087965 A1 | 3/2019 | Datta | |
| 2019/0184286 A1 | 6/2019 | Du et al. | |
| 2019/0197402 A1 | 6/2019 | Kovacs et al. | |
| 2019/0213423 A1* | 7/2019 | Haberstroh | H04N 21/41407 |
| 2019/0279618 A1* | 9/2019 | Yadav | G06F 40/30 |
| 2019/0294881 A1 | 9/2019 | Polak et al. | |
| 2019/0354759 A1 | 11/2019 | Somers et al. | |
| 2019/0381407 A1 | 12/2019 | Aghdaie et al. | |
| 2019/0388789 A1 | 12/2019 | Aghdaie et al. | |
| 2020/0078685 A1 | 3/2020 | Aghdaie et al. | |
| 2020/0098173 A1 | 3/2020 | McCall | |
| 2020/0104337 A1* | 4/2020 | Kelly | H04L 51/52 |
| 2020/0193671 A1 | 6/2020 | Tamir | |
| 2020/0306640 A1 | 10/2020 | Kolen et al. | |
| 2020/0342677 A1 | 10/2020 | Molyneaux et al. | |
| 2021/0001229 A1 | 1/2021 | Somers et al. | |
| 2021/0008456 A1 | 1/2021 | Somers et al. | |
| 2021/0027119 A1 | 1/2021 | Skuin et al. | |
| 2021/0038975 A1* | 2/2021 | Grillet | G06F 3/04815 |
| 2021/0086083 A1 | 3/2021 | Aghdaie et al. | |
| 2021/0093974 A1 | 4/2021 | Aghdaie et al. | |
| 2021/0275925 A1 | 9/2021 | Kolen et al. | |
| 2021/0314525 A1* | 10/2021 | Raduchel | H04N 21/8106 |
| 2022/0014895 A1* | 1/2022 | Horelik | G08B 21/0261 |
| 2022/0038474 A1* | 2/2022 | Nag | G06N 3/045 |
| 2023/0114325 A1 | 4/2023 | Keable | |
| 2023/0296398 A1* | 9/2023 | Sanchez-Rosito | G01C 21/3807 701/532 |
| 2024/0005146 A1* | 1/2024 | Anand | G06N 3/006 |
| 2024/0153195 A1 | 5/2024 | Keable | |

(56) References Cited

U.S. PATENT DOCUMENTS

| | | | |
|---|---|---|---|
| 2024/0325901 A1 | 10/2024 | Sthaneshwar et al. | |
| 2025/0093932 A1* | 3/2025 | Dorsey | G06F 1/28 |

FOREIGN PATENT DOCUMENTS

| | | |
|---|---|---|
| CN | 107274466 A | 10/2017 |
| CN | 108499108 A | 9/2018 |
| CN | 108604222 A | 9/2018 |
| CN | 109359120 A | 2/2019 |
| CN | 109933982 A | 6/2019 |
| CN | 111744200 A | 10/2020 |
| CN | 112169339 A | 1/2021 |
| KR | 10-2009-0092007 A | 8/2009 |
| KR | 10-2012-0052228 | 5/2012 |
| KR | 10-2013-0118433 A | 10/2013 |
| KR | 10-2014-0033088 | 3/2014 |
| KR | 101603681 B1 | 3/2016 |
| KR | 10-2016-0115959 | 10/2016 |
| KR | 10-2016-0145732 | 12/2016 |
| KR | 10-2060879 B1 | 12/2019 |
| KR | 10-2296906 B1 | 8/2021 |
| KR | 10-2360420 B1 | 2/2022 |

OTHER PUBLICATIONS

Aristidou et al., "Inverse Kinematics Techniques in Computer Graphics: A Survey," Comp Graphics Forum, vol. 00:1-24 (2017).
Bengio, et al., Curriculum Learning, Proceedings of the 26th International Conference on Machine Learning, 2009, in 8 pages.
Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.
Chen et al., "Visualization System for Animating Vertebrate Animal Models", 2012, IEEE, 2012 Conference on Technologies and Applications of Artificial Intelligence, pp. 244-249.
Chou et al., "Self Adversarial Training for Human Pose Estimation", Nov. 15, 2018, APSI PA, Proceedings, APSI PA Annual Summit and Conference 2018, pp. 17-30.
Davis et al., "A Sketching Interface for Articulated Figure Animation," Eurographics—SIGGRAPH Symp on Comp Animation (2003).
Donges, Niklas, Transfer Learning—Towards Data Science, Apr. 23, 2018, https://towardsdatascience.com/transfer-learning-946518f95666.
Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.
Ho, et al, Generative Adversarial Imitation Learning, pp. 1-14, arXiv:1606.03476v1 [cs.LG]; Jun. 10, 2016.
Isola et al., "Image-to-Image Translation with Conditional Adversarial Networks," BAIR Lab, UC Berkeley (Nov. 26, 2018).
Kanazawa et al., "Learning Category-Specific Mesh Reconstruction from Image Collections", 2018, The European Conference on Computer Vision (ECCV), pp. 371-386.
Mehta et al., "Vnect: Real-time 3D Human Pose Estimation with a Single RGB Camera," ACM Transactions on Graphics, vol. 36:4 (Jul. 2017).
Pittman, "The Pac-Man Dossier," Gamasutra, downloaded on Jun. 1, 2018, available at «https://web.archive.org/web/20161107115846/https://www.gamasutra.com/view/feature/3938/the_pacman_dossier.php?print=1>>.
Pruett, "Defining the All-Important Difficulty Curve," J of Ed, Comm & Value, vol. 8:1, Jan.-Feb. 2008, http ://com mons.pacificu.edu/cg i/viewcontent.cg i?article= 1 002&context=inter08.
Shih et al., "Video-based Motion Capturing for Skelton-based 3D Models," National Taiwan University.
Shorten, "Image-to-Image Translation with Conditional Adversarial Networks," Pix2Pix, https://towardsdatascience.com/pix2pix.869c17900998?gi=e4c177e8a7c7 (Jan. 29, 2019).
Van de Panne, "Control for Simulated Human and Animal Motion," Dept Comp Sci, University of Toronto (1998).
Zweng et al., "Unexpected Human Behavior Recognition in Image Sequences using Multiple Features", Aug. 26, 2010, IEEE, 2010 20th International Conference on Pattern Recognition, pp. 368-371.
"Feature Vector", Brilliant Math & Science Wiki, retrieved on Sep. 4, 2025 from <https://brilliant.org/wiki/feature-vector/>, in 2 pages.
"What is Feature Vector", Deepchecks, retrieved on Sep. 4, 2025 from <https://www.deepchecks.com/glossary/feature-vector/>, in 4 pages.
Alarcon, "Building Vido Game Levels with the Help of AI", May 9, 2018, Nvidia Developer Technical Blog, retrieved from <https://developer.nvidia.com/blog/ai-helps-video-game-developers-create-new-levels/>, in 9 pages.
Xu et al., "Personalized recurrent neural network language model based on transfer learning", Aug. 30, 2018, Journal of Nanjing University of Science and Technology. 2018(04) p. 401-408.

* cited by examiner

AUTOMATED PERSONALIZED VIDEO GAME GUIDANCE SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Software developers typically desire that their software engage a user for as long as possible. The longer the user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a computer-implemented method including: as implemented by an interactive computing system configured with specific computer-executable instructions, accessing a feature vector associated with a user, wherein the feature vector is extracted from a set of user interaction data associated with the user and obtained based on interaction by the user with a video game; accessing a cluster map including a mapping of user clusters, wherein each location within the cluster map is associated with a set of users whose feature vectors are within a threshold degree of similarity of each other; determining a map location within the cluster map associated with the user based at least in part on the feature vector; determining a target map location within the cluster map; determining a guidance action based at least in part on the target map location and the map location associated with the user; and executing the guidance action.

In some aspects, the techniques described herein relate to a computer-implemented method, wherein the cluster map includes a self-organizing map generated by processing, using a neural network, a set of feature vectors extracted from user interaction data for a plurality of users that interact with the video game.

In some aspects, the techniques described herein relate to a computer-implemented method, wherein determining the map location within the cluster map includes comparing the feature vector with a set of features associated the map location.

In some aspects, the techniques described herein relate to a computer-implemented method, wherein the set of features are determined based on a set of feature vectors associated with a set of users associated with the map location.

In some aspects, the techniques described herein relate to a computer-implemented method, wherein the guidance action corresponds to an in-game tutorial, and wherein executing the guidance action includes outputting the in-game tutorial.

In some aspects, the techniques described herein relate to a computer-implemented method, wherein the guidance action corresponds to playable content of the video game, and wherein executing the guidance action includes causing the playable content to be made available to the user.

In some aspects, the techniques described herein relate to a computer-implemented method, wherein the playable content is dynamically generated.

In some aspects, the techniques described herein relate to a computer-implemented method, wherein the target map location is associated with a set of features, and wherein the guidance action is determined to reduce a difference between the feature vector of the user and the set of features of the target map location over time thereby adjusting the map location associated with the user to be the target map location.

In some aspects, the techniques described herein relate to a computer-implemented method, wherein the target map location and the map location associated with the user are the same, and wherein the guidance action is determined so as to maintain the user associated with the target map location.

In some aspects, the techniques described herein relate to a computer-implemented method, wherein the guidance action is determined using a reinforcement-learning based policy.

In some aspects, the techniques described herein relate to a computer-implemented method, wherein the guidance action is executed at a first time, and wherein, at a second time that is later than the first time, the method further includes: determining a second map location within the cluster map associated with the user based at least in part on a second feature vector associated with the user; determining whether the second map location matches the target map location; and in response to determining that the second map location does not match the target map location, initiating a remedial action.

In some aspects, the techniques described herein relate to a computer-implemented method, wherein the remedial action modifies the reinforcement-learning based policy.

In some aspects, the techniques described herein relate to a computer-implemented method, further including: receiving an indication of a target goal associated with the video game; and selecting the target map location based at least in part on the target goal.

In some aspects, the techniques described herein relate to a computer-implemented method, further including: extracting a set of features from a set of user interaction data associated with a plurality of users that interact with the video game; applying a map-based machine learning algorithm to the set of features to obtain the cluster map; receiving an identification of a key feature indicator; and categorizing clusters of users within the cluster map based at least in part on the key feature indicator.

In some aspects, the techniques described herein relate to a computer-implemented method, wherein the map location is associated with a first value of the key feature indicator, wherein the first value of the key feature indicator is associated with the feature vector of the user, and wherein a second value of the key feature indicator is associated with the target map location.

In some aspects, the techniques described herein relate to a system including: an electronic data store configured to store a cluster map including a mapping of user clusters; a hardware processor of an interactive computing system in communication with the electronic data store, the hardware processor configured to execute specific computer-executable instructions to at least: access a feature vector associated with a user, wherein the feature vector is extracted from a set of user interaction data associated with the user and obtained based on interaction by the user with a video game; access the cluster map from the electronic data store, wherein each location within the cluster map is associated with a set of users whose feature vectors are within a threshold degree of similarity of each other; determine a map location within the cluster map associated with the user based at least in part on the feature vector; identify a target map location within the cluster map; select a guidance action based at least in part on the target map location and the map location associated with the user; and cause the guidance action to be executed.

In some aspects, the techniques described herein relate to a system, wherein the guidance action includes a recommendation of playable content within the video game to access, and wherein the hardware processor causes the guidance action to be executed by causing a modification to a state of the video game to trigger initiation of the playable content.

In some aspects, the techniques described herein relate to a system, wherein the guidance action includes a user-specific in-game tutorial, and wherein the hardware processor causes the guidance action to be executed by causing the video game to present the user-specific in-game tutorial to the user.

In some aspects, the techniques described herein relate to a system, wherein the guidance action is selected to modify user interaction with the video game such that the association of the user with the map location changes to an association with the target map location over a time period.

In some aspects, the techniques described herein relate to a system, wherein the hardware processor is further configured to execute specific computer-executable instructions to at least: determine a second map location within the cluster map associated with the user after the user interacts with the video game for a threshold time period; compare the second map location to the target map location; and update a guidance policy that include the guidance action based at least in part on the comparison of the second map location to the target map location.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Introduction

Figure 1:
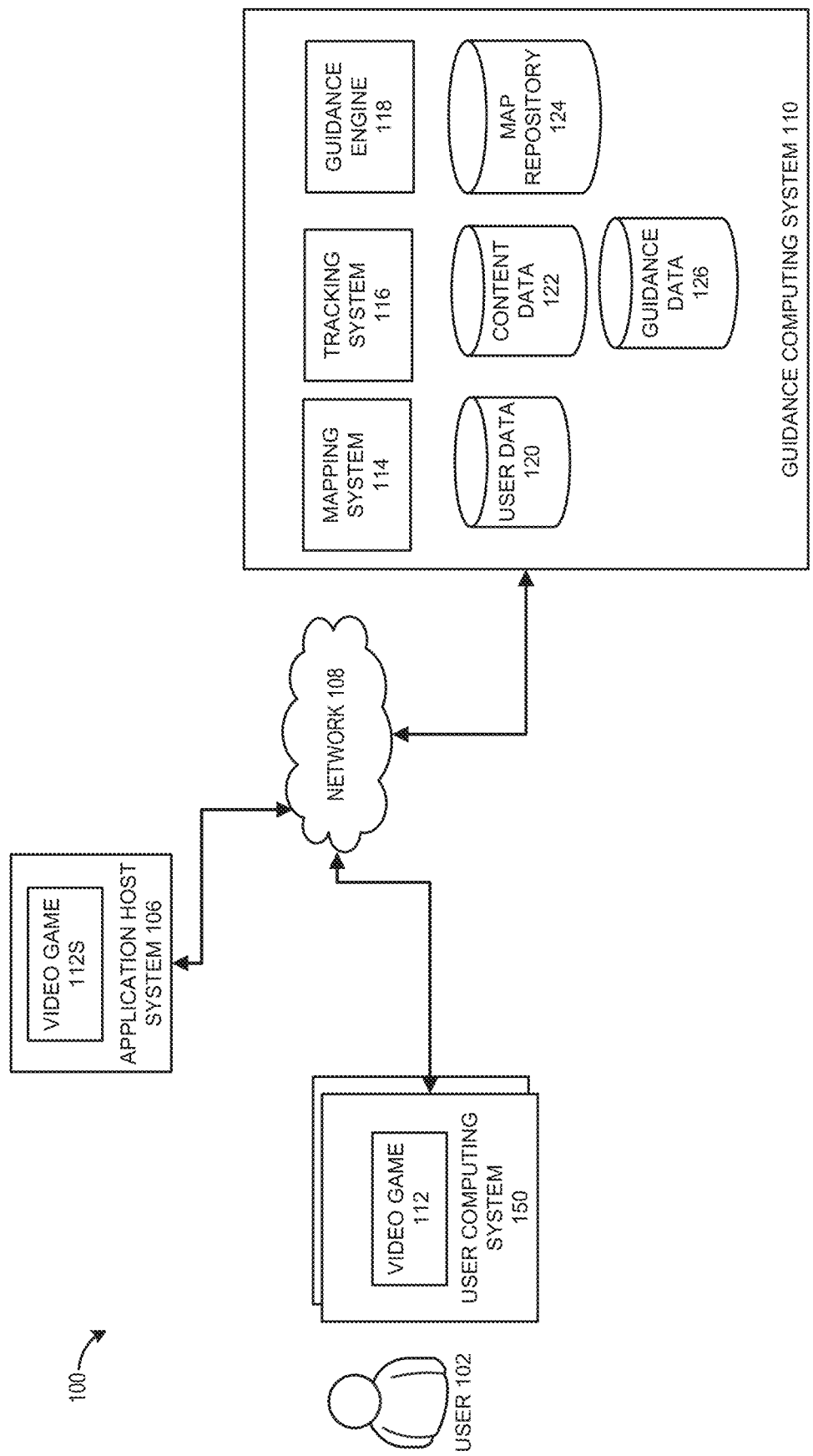
FIG. 1 illustrates aspects of a networked computing environment that can implement one or more aspects of a video game guidance system in accordance with certain aspects of the present disclosure.

It is desirable to keep users engaged with a video game. The more engaged the user is, the more likely that the user is enjoying the experience, which may lead to the user recommending the video game to others, purchasing future releases, and/or appreciating the initial purchase. Conversely, the less engaged the user is or the less enjoyable the user's time spent playing a video game, the more likely the user is to not play the video game, to not recommend the video game to others, and to not make future purchases. Thus, it is desirable to ensure that the user has a positive experience playing the video game. The more users enjoy interacting with a video game, the higher the retention rate of users or conversely, the lower the churn rate among users. For multiplayer games, it may be particularly desirable to maintain a high retention rate and to have a high adoption rate as it can be the case that the more users playing the video game, the more enjoyment each individual user may have playing the game due to the social aspects of multiplayer video games.

One reason a user may not enjoy playing a video game is if the user has difficulty playing the video game, advancing within the video game, and/or improving in skill with respect to the video game. Although tutorials can be used to help a user learn the basics (e.g., user commands, gameplay options, etc.) of playing a particular video game, the benefit of tutorials are often limited because, for example, the tutorials may not be personalized and therefore, may not address problems particular users may be having playing the video game. For example, one individual may have trouble using a particular skill, another individual may have trouble defeating a particular enemy, and yet another individual may have trouble grasping the most complex in-game skills preventing the user from transitioning from being a good player to being a top player. Even when dealing with similar mechanics or similar rules, how users interact with the video game can be very different. Thus, while a basic or standard tutorial may be sufficient for teaching a novice the basic rules of the game, it may be insufficient for anything more complex. Further, in complex video games, it may be difficult to identify the specific difficulties a user is having playing a video game.

Even when it is possible to identify the specific difficulty a user is having advancing or improving in skill level, it can be challenging to identify the specific help or guidance the user needs to progress in the video game or to improve in skill. For example, in a sports game (e.g., EA SPORTS® FIFA 22), a user may play very defensively and that may correlate to how well the user is scoring and how well the user is blocking opponents trying to score. Telling a user to improve the user's defensiveness so as to improve the user's scoring is unlikely to happen. Similarly, it is unlikely to be helpful to tell a user to increase the user's scoring while ignoring the impact on defensiveness.

Another reason a user may not enjoy playing a video game is that the video game may not include content or the user may not be aware of included content that is of particular enjoyment to the user. For example, a user may particularly enjoy dungeon-based levels or city focused levels. The more opportunities the user has to play dungeon-based or city focused levels, the higher the likelihood of retention for that particular user. Conversely, another user may be less likely to continue playing such levels.

In both the tutorial use case and the content use case, it is desirable to generate user-specific guidance. This user-specific guidance may be determined using machine learning techniques that can determine or predict within the rule sets of the video game how changing different features, playstyles, or strategies can result in users advancing in skill and/or within the video game. Based on the determinations and an identity of a user's current skills, personalized guidance can be developed to assist the user in progressing within the video game or in improving the user's skill with respect to the video game. Aspects of the present disclosure use machine learning techniques to generate user-specific guidance by analyzing user interaction data for interactions with a video game. In some cases, there may be a very large amount of data to be analyzed to generate personalized video game guidance. Further, it may not be obvious what type of guidance a user may need or desire.

By using unsupervised machine learning techniques, it is possible to compress and cluster user data or statistics onto a map or map-like grid (e.g., using self-organizing maps) to be able to track how players or users evolve over time with respect to interactions with a video game. The map can be used to train a reinforcement learning (RL)-based policy, which may be used to determine how to target content or guidance to users in order to evolve the users' skills/experience in desirable ways.

Aspects of the present disclosure may be used to recommend content to users. In some cases, there may be a correlation between skill and interests. Thus, in some cases, personalized guidance may recommend particular content that may be of interest to the user and/or that may help the user. In some cases, the guidance may be provided to non-player users to, for example, assist in developing new content. For example, if it is determined that a majority of users interact with dungeon-based content, developers may focus time developing more dungeon-based content instead of other content for a video game.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language), productivity or business applications, or any type of application where the number of possible actions that a user may perform can be large, such as hundreds, thousands, tens of thousands, some range between the foregoing, or more.

Example Networked Computing Environment

FIG. 1 illustrates aspects of a networked computing environment 100 that can implement one or more aspects of a video game guidance system in accordance with certain aspects of the present disclosure. The video game guidance system may be implemented by a guidance computing system 110.

The networked computing environment 100 may be configured to map or otherwise group users based on user interaction data obtained from interaction between users and a video game 112. Using the mapped data, guidance or other recommendations can be determined and presented to a user, or otherwise be used to modify the video game 112.

The video game 112 may include any type of video game that is playable on any type of computing device. Further, the video game 112 may be hosted by a client computing device, such as the user computing system 150. Alternatively, the video game 112 may be hosted by a server, such as a game server or a web server, and may be referred to as an application host system 106. In some cases, the video game may be partially hosted by a client and partially hosted by a server. For example, the video game 112 may be a game that includes a persistent world. In some such cases, a portion of the video game 112 may be hosted by a client (e.g., the user computing system 150) and a portion of video game 112 may be hosted by a server (e.g., the application host system 106). The portion of the video game hosted by the application host system 106 may be referred to as the video game 112S.

The networked computing environment 100 includes a guidance computing system 110. The guidance computing system 110 may include any type of computing system that can generate a mapping of user clusters where each user cluster includes a cluster or grouping of users that are grouped based at least in part on user interaction data obtained from user interactions with the video game 112. The mapping may be generated using one or more machine learning algorithms that enable users associated with large sets of, in some cases, disparate data to be grouped. For example, the users may be grouped using self-organizing maps (SOM) that enable a higher dimensional data set to be represented using a low-dimensional representation. It should be understood that embodiments of the present disclosure may be implemented using other neural network based machine learning algorithms and/or other unsupervised machine learning techniques.

Users grouped in particular locations within the self-organizing map may be associated with different features that may correspond to a skill of the users. Some map locations may be associated with users of a low skill level with respect to playing the video game 112 and other map locations may be associated with a high skill level.

The guidance computing system 110 may further include any type of computing system that may use the generated mapping of user clusters to help identify or generate guidance to guide a user to learn or perform skills within the video game 112 that, over time, may improve the user's skill with respect to interacting with the video game 112. The guidance may be determined by determining how to modify features or data associated with the user such that the user's classification within the SOM moves the user from a first map location (e.g., associated with low-skilled players) to a second or target map location (e.g., associated with high-skilled players).

In certain implementations, the guidance computing system 110 may include a mapping system 114, a tracking system 116, and a guidance system 118. Further, the guidance computing system 110 may include a user data repository 120, a content data repository 122, a map repository 124, and a guidance repository 126. Although described as separate repositories, it should be understood that two or more of the repositories of the guidance computing system 110 may be combined into one repository and conversely at least one of the repositories may be split into multiple repositories.

Figure 6A:
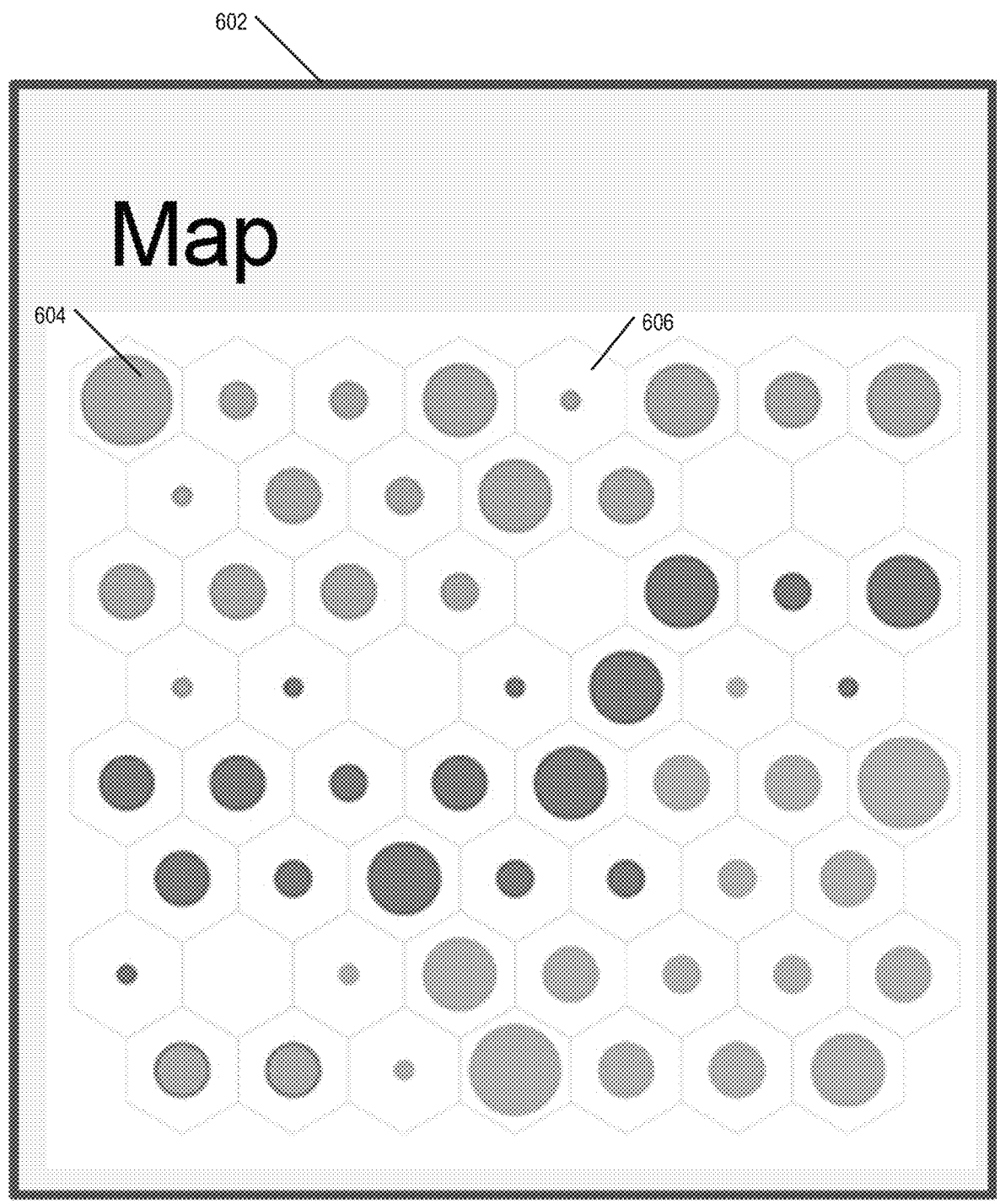
FIGS. 6A and 6B illustrate an example of a cluster map in accordance with certain aspects of the present disclosure.

The mapping system 114 may include any system that can group or cluster users together using one or more machine learning algorithms applied to a set of user interaction data associated with the users and obtained from user interactions with the video game 112. For example, the mapping system 114 may use SOMs to cluster users within different locations of a map based at least in part on similarities between data obtained from user interaction with the video game 112. One non-limiting example of a cluster map that may be generated based on user interaction data is illustrated in FIG. 6A, which is described in more detail below. As the users are clustered together, the map may be referred to as a cluster map. The data may be associated with how each user interacts with the video game 112. For example, the data may be associated with choices a user makes within the video game 112, tools or actions used during attempts to progress within the video game 112, playstyle, success performing particular in-game actions, or any other data that may be obtained based on the user's interaction with the video game 112. Although SOMs are identified as one example of a type of machine learning algorithm that may be used to cluster users, other machine learning algorithms may be used including other unsupervised machine learning models, such as neural networks. However, some machine learning models may be less desirable. In particular, machine learning models that lack interpretability in terms of determining similarity between data sets may be less desirable. Further, machine learning algorithms that are not graph-based may be less effective in certain embodiments.

The generated cluster map may be stored in the map repository 124. A different cluster map may be generated for different video games or for different sets of users. In some cases, the mapping system 114 may use different features or portions of the user interaction data to generate the cluster map. By focusing on different data within the user interaction data, different discoveries about the users and/or the video game 112 may be determined. For example, one mapping generated using one subset of user interaction data may be used to determine what skills are best to progress through the video game, while another mapping generated using another subset of user interaction data associated with the same users might identify the type of content that is most likely to retain users, which may or may not correlate to the skill of the users or the difficulty of the video game 112.

The user computing system 150 and/or the application host system 106 may provide the user interaction data to the guidance computing system 110. The user interaction data may be obtained based on user interaction by the user 102 with the video game 112 and/or the video game 112S. The user interaction data may include any type of data associated with playing the video game 112 including, for example, configuration data associated with how the video game 112 is configured and command data associated with operations performed by the user 102 when interacting with the video game 112. This command data may be based on how the user interacts with the video game 112 using a controller or other user input device. For example, the command data may indicate whether a user caused an in-game character to jump, shoot, run, swim, block, etc. The user interaction data may be stored at the user data repository 120. In some cases, the user interaction data is filtered to remove data that is unlikely to be associated with a skill of a player. For example, in video games where a user may personalize in-game character appearance, such data is unlikely to correlate to a user's skill and can be filtered from the user interaction data.

The tracking system 116 may include any system that can track how one or more users are grouped or clustered within the cluster map. For example, a user may initially be grouped with a first cluster of users based on similarities between the user and the first cluster of users with respect to interactions and success in playing the video game 112. Over time, the user interaction data associate with the user may change as the user interacts with the video game and improves in skill. As such, the user may be grouped with a second cluster and may be no longer grouped with the first cluster. The tracking system 116 may track the change in the cluster associated with the user, which may correspond to a change in a location within the cluster map generated by the mapping system 114. Further, the tracking system 116 may determine whether the user's skill is changing as expected or desired from provided guidance based on changes in the user's location within the cluster map.

The guidance system 118 may include any system that can generate or select guidance actions. These guidance actions may include tutorials to help a user improve the user's skill within the video game 112. Alternatively, or in addition, the guidance actions may relate to making particular content available to the user that is predicted to be of interest to the user based on a location of the user within the cluster map. Generally, the guidance actions may include any type of recommendations of actions, content, tutorials, and the like that can guide a user from one cluster (or location) within the cluster map associated with users with a first set of similar user interaction data to another cluster (or location) within the cluster map with a second set of similar user interaction data that differs from the first set of user interaction data. In some cases, the guidance actions may be selected to help retain the user within a cluster of the cluster map. The guidance data may be stored within the guidance repository 126. In cases where the guidance data includes recommendations of new content for the video game 112, the new content may be stored in the content data repository 122.

The user computing system 150 may include an instance of the video game 112 with which a user 102 may interact or play. The user computing system 150 may include or host a video game 112. In some cases, the video game 112 may execute entirely on the user computing system 150. In other cases, the video game 112 may execute at least partially on the user computing system 150 and at least partially on the application host system 106 (e.g., the video game 112S). In some cases, the video game 112 (e.g., the video game 112S) may execute entirely on the application host system 106, but a user may interact with the video game via the user computing system 150. For example, the game may be a massively multiplayer online role-playing game (MMORPG) that includes a client portion executed by the user computing system 150 (or a plurality of user computing systems 150) and a server portion executed by one or more application host systems 106. As another example, the video game 112 may be an adventure game played on the user computing system 150 without interacting with the application host system 106.

The user computing system 150 may include hardware and software components for establishing communications over a communication network 108. For example, the user computing system 150 may be equipped with networking equipment and network software applications (for example, a web browser) that facilitate communications via a network (for example, the Internet) or an intranet. The user computing system 150 may have varied local computing resources, such as central processing units and architectures, memory, mass storage, graphics processing units, communication network availability and bandwidth, and so forth. Further, the user computing system 150 may include any type of computing system. For example, the user computing system 150 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 150 may include one or more of the embodiments described below with respect to FIGS. 12 and 13.

The network 108 can include any type of communication network. For example, the network 108 can include one or more of a wide area network (WAN), a local area network (LAN), a cellular network, an ad hoc network, a satellite network, a wired network, a wireless network, and so forth. Further, in some cases, the network 108 can include the Internet.

Example Map Generation Process

Figure 2:
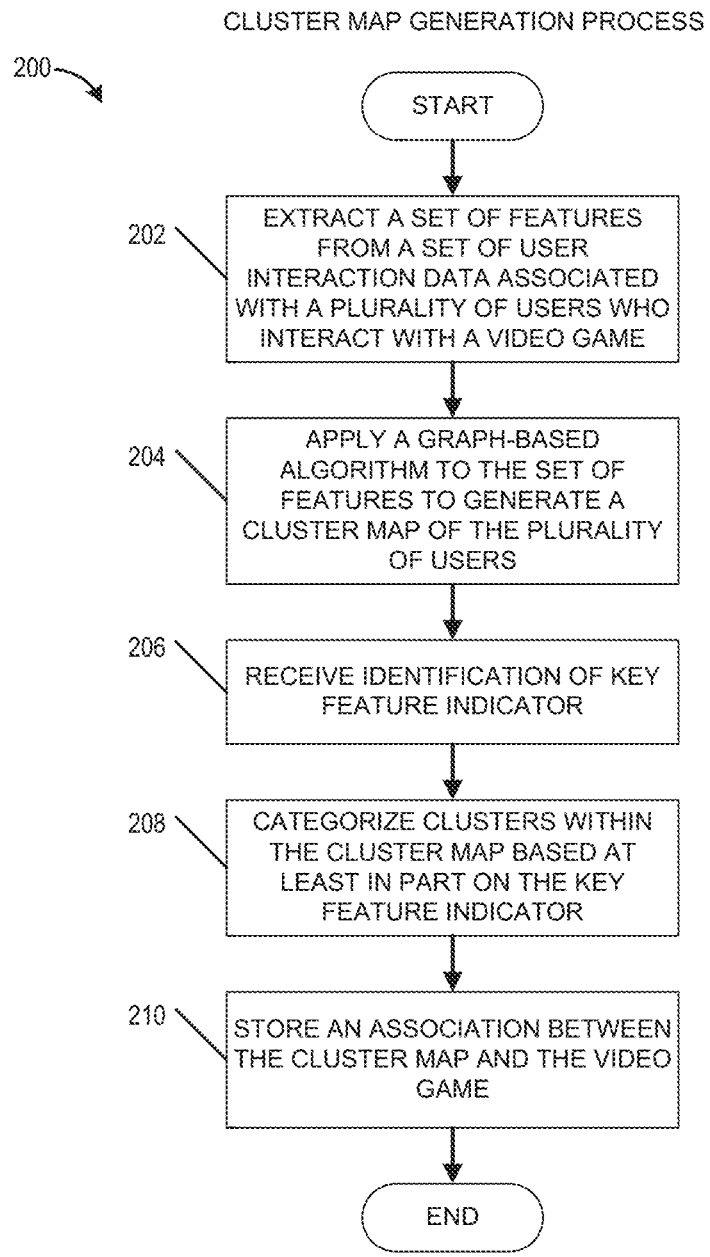
FIG. 2 presents a flowchart of an embodiment of a cluster map generation process in accordance with certain aspects of the present disclosure.

FIG. 2 presents a flowchart of an embodiment of a cluster map generation process 200 in accordance with certain aspects of the present disclosure. The process 200 can be implemented by any system that can generate map data structure of users based on data (e.g., user interaction data associated with interaction with the video game 112) associated with each of the users. The process 200, in whole or in part, can be implemented by, for example, a guidance computing system 110, a mapping system 114, a user computing system 150, an application host system 106, a tracking system 116, a guidance system 118, and the like. Although any number of systems, in whole or in part, can implement the process 200, to simplify discussion the process 200 will be described with respect to particular systems.

The process 200 begins at block 202 where, for example, the mapping system 114 extracts a set of features from a set of user interaction data associated with a plurality of users who interact with a video game 112. In some cases, the block 202 may be performed by a feature extractor (not shown), which may provide the extracted features to the mapping system 114.

The user interaction data may include data of high dimensionality in which the number of features or variables observed may be larger than the number of data points. For example, the user interaction data may include every action a user has performed in-game when playing the video game 112 over a particular time period. Moreover, the user interaction data may include the state of the video game 112 when each action is performed. Each user may perform different actions when playing the video game 112. Moreover, even when users perform similar or the same actions, the state of the video game 112 may differ when one user is performing an action compared to when another user is performing the same or similar action within an instance of the video game 112. Additionally, randomness or pseudo-randomness within the video game 112 may cause variance in the state of the video game 112 when different users are performing actions. Accordingly, the amount of user interaction data, which may include video game state data, can be significantly more than can be processed without the help of a computing system.

Further, it may be challenging to identify the features from the user interaction data that is meaningful for determining whether a user needs or could benefit from guidance and the type of guidance that can be helpful to the user for advancing in the video game 112 or for improving in skill with respect to the video game 112.

To help process the user interaction data, the mapping system 114 may perform an autoencoder data compression process. For example, the mapping system 114 may use a variational autoencoder (VAE) that uses a neural network architecture to compress the user interaction data. In some embodiments, the autoencoder data compression process may be used to reduce the high dimensional data to low dimensional data. For example, the autoencoder data compression process may compress a 128-dimension data to a 25-dimensional space.

In some cases, the mapping system 114 may extract feature vectors associated with each user from the user interaction data. Each feature vector may include a set of variables corresponding to user interaction with the video game 112. Each of the set of variables may have a value associated with a state of the video game 112 and/or operations performed by a user when interacting with the video game 112. These operations may correspond to interactions by the user 102 with a user interface, such as a controller or gamepad, a keyboard, a mouse, or a touch screen interface.

The types of variables included in the feature vector are not limited and may include any type of data that can be extracted from user interaction data and specifically, any type of data that may be associated with a user's skill, progress, behavior, or interest with respect to the video game 112. Some non-limiting examples of data that may be included in the feature vector include: in-game character statistics, game progress, time spent playing particular content within the video game 112, actions performed to complete or attempt to complete in-game objectives, play style, character selection, in-game resources utilized, win rate, number of attempts to complete an in-game objective, number of enemies defeated, types of enemies defeated, skill level of opponents defeated, skill level of opponents who defeated the user, and the like.

At block 204, the mapping system 114 may apply a graph-based or map-based algorithm to the set of features to generate a cluster map of the plurality of users. The graph-based or map-based algorithm may include any type of unsupervised machine learning algorithm that can generate a map of users based at least in part on the user interaction data or the set of features extracted from the user interaction data. For example, the graph-based algorithm may be a self-organizing mapping algorithm or a self-organizing feature map algorithm. In some cases, the graph-based algorithm may be a semi-unsupervised machine learning algorithm that may include some user supervision. The graph-based algorithm may generate a two-dimensional map or data set from the feature vectors associated with the set of users. In some cases, the mapping system 114 may use any type of machine learning algorithm that can cluster or otherwise categorize users based on a degree of similarity determined from the user interaction data or from feature vectors extracted from the user interaction data. For example, the mapping system 114 may use any type of unsupervised grid-based mapping technique.

In some embodiments, the mapping system 114 may use any type of machine learning algorithm that includes one or more of the following features: (i) flexibility in the number of clusters generated; (ii) not requiring a number of clusters to be specified ahead of clustering optimization; (iii) variability in the granularity of the clustering; (iv) an ability to divide or aggregate clusters based on one or more desired features; and/or (v) clusters are similar to neighboring clusters within a map or more similar clusters are closer in the map to a particular cluster than less similar clusters enabling the representation of both macro and local similarity within the map. Non-limiting examples of algorithms that include one or more of the aforementioned features may include certain implementations of hierarchical clustering and affinity propagation clustering. The specific mapping algorithms used may impact how the mapping system 114, the tracking system 116 or the guidance engine 118 interprets the resultant map. For example, grid layout mapping, different algorithms may distribute data differently along the generated grid and thus, may result in different interpretations of what it means to move or travel through, between, and/or towards clusters within the map.

A non-limiting example of the two-dimensional map that may be generated by applying a graph-based algorithm to the set of feature vectors is illustrated in FIG. 6A. FIG. 6A illustrates an example of a cluster map 602 in accordance with certain aspects of the present disclosure. The cluster map 602 includes a set of different sized circles. Each of the different sized circles represents a cluster of users that have been grouped together based at least in part on a similarity between feature vectors of each of the users included within the cluster of users. The larger the circle, the more users within the grouping or cluster represented by the circle. For example, the cluster 604 includes more users than the cluster 606. Each of the clusters may include a plurality of users whose feature vectors are within a threshold degree of similarity. In some cases, a cluster may include a single user. For example, a user whose feature vector differs from the feature vectors of other users whose user interaction data is being classified or otherwise compared may be associated with a cluster that includes only the user. The threshold used for the threshold degree of similarity may be dependent on the number of users whose data is included in the user interaction data or the relative to degree of similarity between the user interaction data of each of the users. For example, if the user interaction data indicates that most of the users are highly similar, a threshold degree of similarity used to group or cluster the users may be higher than if the user interaction data indicates more divergence between users. Further, clusters within the map that are closer together may indicate more similarity between clusters (or between users grouped within the clusters) than clusters that are further together within the map. For example, with reference to FIG. 6B, users grouped within the cluster 620 may have feature vectors that are more similar to feature vectors of users grouped within the cluster 626 than with feature vectors of users grouped within the cluster 606 or the cluster 628. Moreover, the users grouped within the cluster 620 may be more similar to the users grouped within the cluster 626 than the users grouped within the cluster 606 regardless of cluster 620 and cluster 606 being in same region 610 while cluster 626 is in a different region 612.

Although illustrated as a map with different locations within the map representing different clusters of users, it should be understood that other data structures may be used to group users and to identify groupings or clusters of users. Further, while the relative size of the circles corresponds to the relative size of the grouping of users within each cluster, it is possible for other features of the data structure to indicate a size of a grouping of users.

At block 206, the mapping system 114 receives an identification of a key feature indicator. The key feature indicator may be a single feature or a set of features. Further, the key feature indicator may be any type of feature derivable from the user interaction data that may be used to classify one or more clusters included in the cluster map. in some cases, the key feature indicator may refer to a feature included in the feature vectors of the users. In other cases, the key feature indicator may refer to an abstraction or a feature that may be determined based on or derived from a set of features included within the user interaction data, but that may not be or refer to a specific feature included in the user interaction data. For example, the key feature indicator may be skill level, which may not be a feature or characteristic included in the user interaction data but may be determined and based on the features or user interaction data associated with each user. For instance, the skill level of each user may be derived from actions performed by the user when the video game 112 is configured with particular states. If the user performs actions that are unlikely to result in success when the video game 112 is in a particular state, the user may be classified as a low-skill user. Conversely, if the user performs actions that are likely to result in success when the video game 112 is in the particular state, the user may be classified as a high-skill user. Thus, the key feature indicator may be one or more data metrics of interest or maybe derivable classification from the one or more data metrics, which may be included in or derived from the user interaction data.

At block 208, the mapping system 114 categorizes clusters within the cluster map based at least in part on the key feature indicator. The categorization process based on the key feature identified at the block 206 may be an automated process. Alternatively, the categorization process may be a manual process. In some cases, the block 206 may be optional or omitted, and the categorization may be performed without the identification of a key feature. for example, the categorization of the clusters may be determined or extracted from in the similarities of the feature vectors. For instance, Suppose the video game 112 is a soccer game. If a group of clusters Includes players who tend to allow very few goals, the group of clusters may be categorized as defensive players. Conversely, if another group of clusters includes players who tend to score a lot, the group of clusters may be categorized as offensive players. In this example, the groupings of defensive players and the groupings of offensive players may or may not correspond to skill level or success. For example, some players who tend to score a lot may in some cases also give up a lot of goals and have poor success.

Figure 6B:
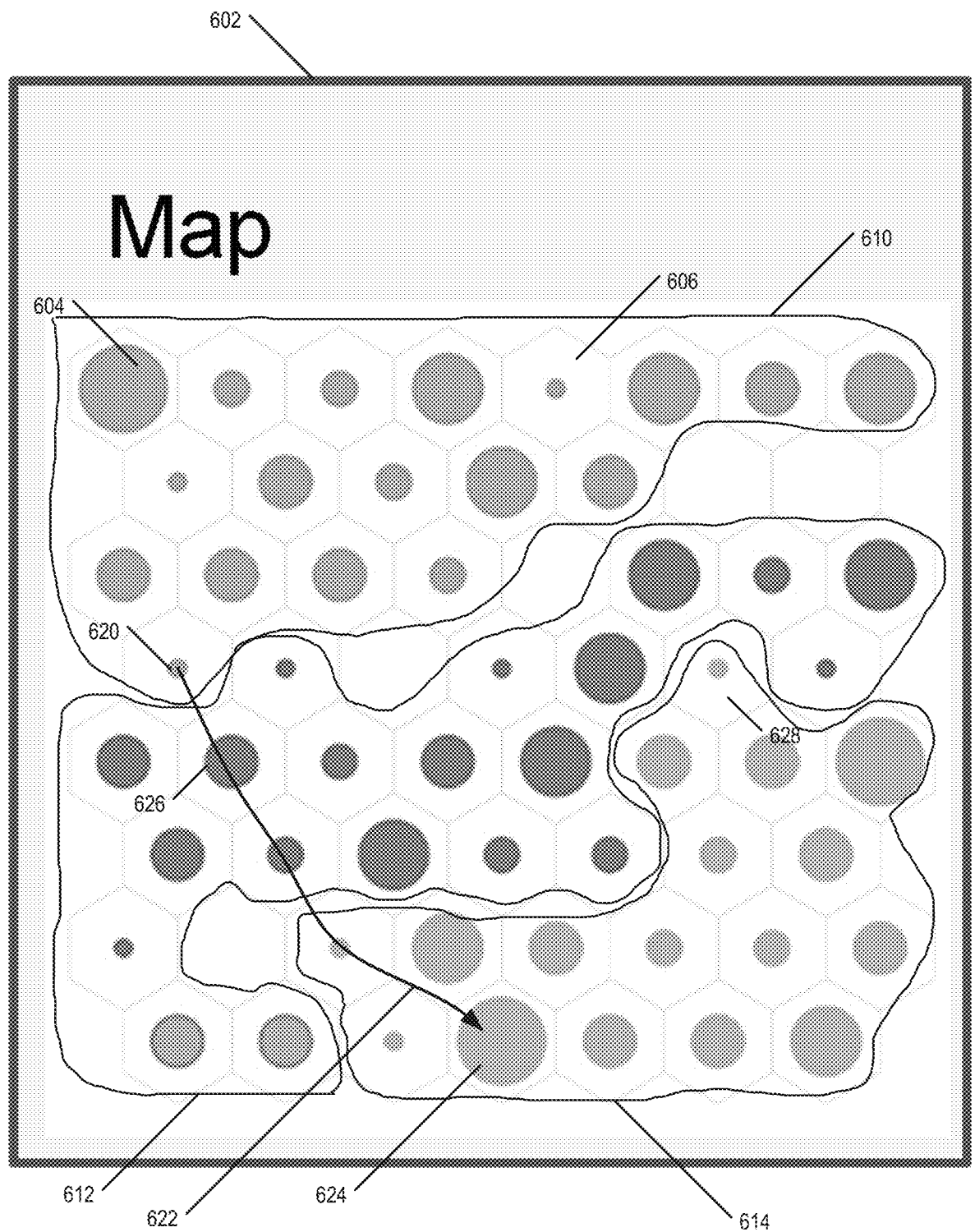

FIG. 6B illustrates an example of the cluster map 602 in accordance with certain aspects of the present disclosure that includes an example of cluster classification. As illustrated in FIG. 6B, the cluster map may be divided into a set of regions that each include one or more clusters or map locations associated with clusters. The regions within the cluster map may be identified based on similarities between the clusters included in the regions that enable classification of the clusters. For example, clusters within the region 610 may include groups of users that have limited success in playing the video game 112. The region 610 may include multiple clusters because, for example, although the groups have users are similar in terms of success and playing the video game 112, they may diverge in other ways, such as in play style. For instance, the users grouped in the cluster 604 may play aggressively while users grouped in the cluster 606 may play more cautiously. But the users in both cluster 604 and cluster 606 may both struggle in completing objectives within the video game 112.

In the example illustrated in FIG. 6B the cluster map 602 is divided into three regions. Each of the regions may be associated with different classifications. For example, region 610 may be associated with low skilled users, region 612 may be associated with medium skilled users, and region 614 may be associated with high skill users. It should be understood that the cluster groupings or groupings of the clusters into regions may be based on factors other than skill. For example, the regions may be associated with different play styles (e.g., offensive, defensive, and neutral, or melee, ranged, and magic). In cases, where the cluster groupings are based on something other than skill, one or more clusters within a region may be associated with different skills. For example, if region 610 is associated with users who play as healers, cluster 604 may be associated with lowly skilled healers and cluster 606 may be associated with highly skilled healers. Thus, it should be understood that the cluster map may include multiple levels of groupings that can be determined based at least in part on the user interaction data.

At block 210, the mapping system 114 stores an association between the cluster map and the video game 112. This association may be stored at the map repository 124.

Example User Addition/Tracking Process

Figure 3:
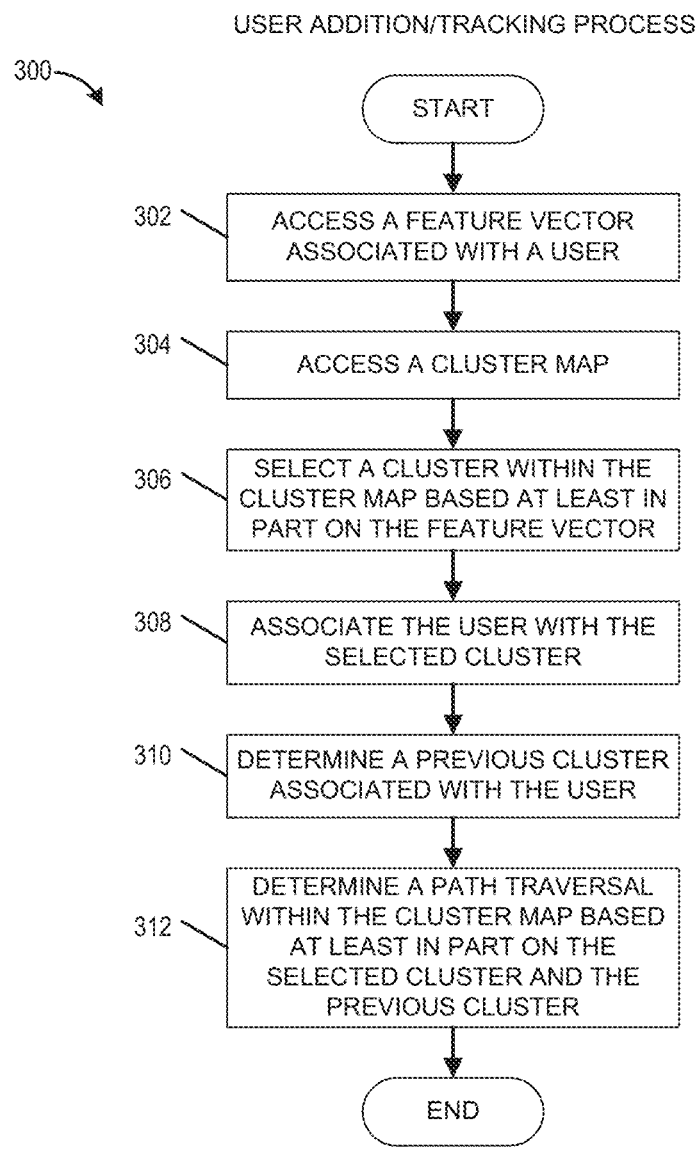
FIG. 3 presents a flowchart of an embodiment of a user addition or tracking process in accordance with certain aspects of the present disclosure.

FIG. 3 presents a flowchart of an embodiment of a user addition or tracking process 300 in accordance with certain aspects of the present disclosure. The process 300 can be implemented by any system that can add a user to the cluster map or that can track movement of the user within the cluster map. The process 300, in whole or in part, can be implemented by, for example, a guidance computing system 110, a mapping system 114, a user computing system 150, an application host system 106, a tracking system 116, a guidance system 118, and the like. Although any number of systems, in whole or in part, can implement the process 300, to simplify discussion the process 300 will be described with respect to particular systems.

The process 300 may begin at block 302 where, for example, the tracking system 116 accesses a feature vector associated with a user 102. The user 102 may be a user that is associated with an existing cluster map for the video game 112 or the user 102 may be a new user. Accessing the feature vector associated with the user 102 may include extracting features from user interaction data associated with the user 102. The user interaction data may be accessed from the user data repository 120.

At block 304, the tracking system 116 accesses a cluster map associated with the video game 112. The cluster map may be accessed from the map repository 124.

At block 306, the tracking system 116 selects a cluster within the cluster map based at least in part on the feature vector. The cluster may be identified by comparing the feature vector associated with the user 102 with one or more feature vectors associated with one or more clusters within the cluster map. In some cases, comparing the feature vector with one or more feature vectors of a cluster within the cluster map may involve comparing the feature vector with feature vectors associated with users that have been grouped together within the cluster. In other cases, the feature vector associated with the user 102 may be compared with an aggregate vector that aggregates feature vectors of users that are grouped within a cluster. The aggregate vector may be an average, weighted average, or other combination of feature vectors of users that are grouped within the cluster. In some cases, each cluster within the map cluster may be associated with particular feature values. The tracking system 116 may compare the feature vector of the user 102 to the particular feature values of the clusters to determine a cluster of users most similar to the user 102. In some implementations, a score may be generated for each cluster that is derived from the feature vectors of the users grouped within the cluster. Further, a score may be determined for the user 102 based at least in part on the feature vector associated with the user 102. By comparing the scores, the tracking system 116 may select the cluster within the cluster map that includes users most similar to the user 102.

At block 308, the tracking system 116 associates the user 102 with the selected cluster. Associating the user with the selected cluster may include grouping the user with other users associated with the selected cluster. Further, associating the user with the selected cluster may include modifying a feature vector associated with the cluster based at least in part on the feature vector of the user 102.

In some embodiments, the process 300 may end after completion of operations associated with the block 308. For example, if a new user is being added to the cluster map, the process 300 may end after completing the operations associated with the block 308. In embodiments where the user 102 is not a new user, but a user already associated with a cluster in the cluster map, the process 300 may continue with the block 310.

At block 310, the tracking system 116 determines a previous cluster associated with the user 102. Determining the previous cluster associated with the user 102 may include accessing data associated with the user at the map repository 124 and/or at the user data repository 120.

At block 312, the tracking system 116 determines a path traversal within the cluster map based at least in part on the selected cluster and the previous cluster. The path traversal indicates a history of the change in clusters associated with the user 102 as the user interacts with the video game 112 over time. This path traversal may be a natural change in some of the user interaction data as the user 102 becomes more experienced or skilled with the video game 112. Alternatively, or an addition, the path traversal may be in response to guidance provided to the user 102 by the guidance system 118. For example, providing personalized tutorials that help the user 102 improve with respect to a particular aspect of the video game 112 may overtime cause sufficient change in user interaction data or metadata associated with the user 102 to result in a change in the cluster associated with the user 102. Thus, while the user 102 may begin at one location within the cluster map (e.g., be associated with a cluster at one location within the cluster map), over time the user may eventually travel to another location within the cluster map (e.g., be associated with another cluster at another location within the cluster map).

FIG. 6B illustrates one possible traversal of the user 102 within the non-limiting cluster map 602. The user 102 may initially be grouped with the cluster 620 based on a comparison of the feature vector of the user 102 with features associated with the cluster 620. The cluster 620 may be in the region 610, which may be associated in some cases with a low skill level. Personalized guidance may be provided to the user 102 in an effort to improve the skill level of the user 102 at playing the video game 112.

Over time, the feature vector associated with the user 102 may change based on additional user interactions of the user 102 with the video game 112. The change in the feature vector may result in the feature vector of the user 102 no longer being similar to the features of the users grouped within the cluster 620. Thus, the location of the user 102 within the cluster maps 602 may change overtime. For example, the feature vector of the user 102 may over time be most similar to features associated with the cluster 624. The cluster 624 may be within the region 614, which may be associated with a higher skill level.

The path traversal 622 illustrates the impact the guidance may have on the interaction by the user 102 with the video game 112 over time. As illustrated, the path traversal 622 may pass through other clusters, such as the cluster 626. In some cases, the clusters that the path traversal 622 passes through may be other clusters that the user 102 is associated prior to the user 102 being associated with the cluster 624. For example, at a first time, the user 102 may have a feature vector based on user interaction with the video game 112 that causes the user 102 to be associated with the cluster 620 within region 610, which may correspond to a low skill level. At some point in time after receipt of guidance (e.g., a tutorial or personalized content, etc.) the user 102 may have a feature vector based on user interaction with the video game 112 that causes the user 102 to be associated with the cluster 626 within region 612, which may correspond to a medium skill level. At yet a later time, the user 102 may have a feature vector based on user interaction with the video game 112 that causes the user 102 to be associated with the cluster 624 within region 614, which may correspond to a high skill level. It should be understood that the change in time may be with respect to an amount of time that the user 102 plays or interacts with the video game 112, and not necessarily a passage of chronological time.

Example User Guidance Process

Figure 4:
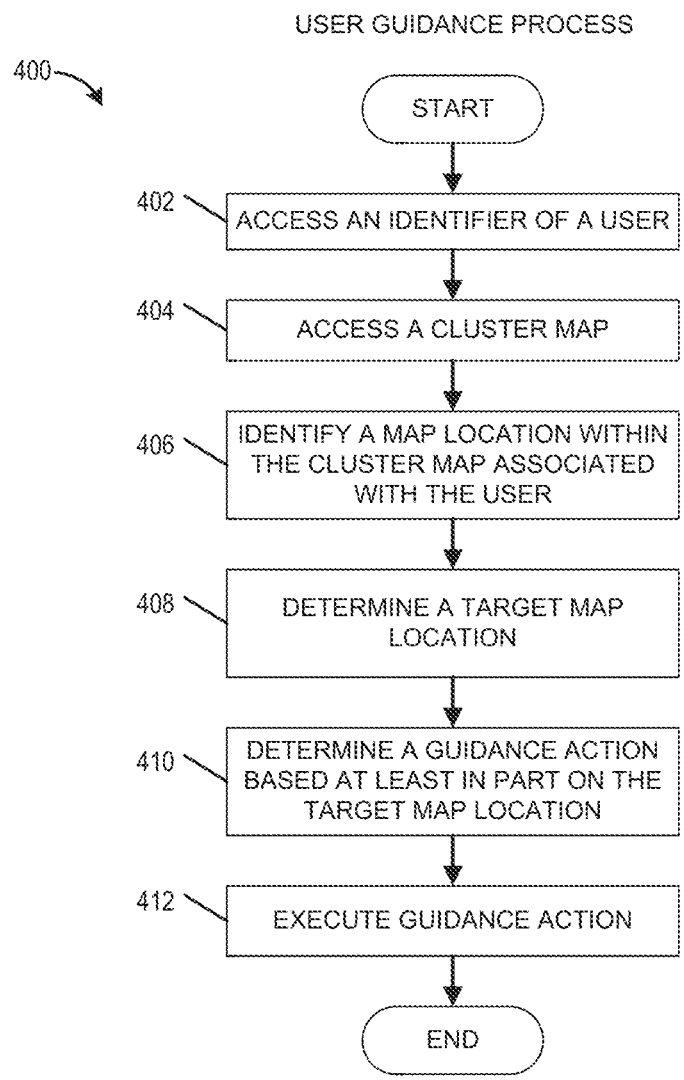
FIG. 4 presents a flowchart of an embodiment of a guidance process in accordance with certain aspects of the present disclosure.

FIG. 4 presents a flowchart of an embodiment of a guidance process 400 in accordance with certain aspects of the present disclosure. The process 400 can be implemented by any system that can provide guidance to a user playing or developing a video game 112. The process 400, in whole or in part, can be implemented by, for example, a guidance computing system 110, a mapping system 114, a user computing system 150, an application host system 106, a tracking system 116, a guidance system 118, and the like. Although any number of systems, in whole or in part, can implement the process 400, to simplify discussion the process 400 will be described with respect to particular systems.

The process 400 may begin at block 402 where, for example, the guidance system 118 accesses an identifier of a user 102. The identifier of the user 102 may include any information that enables the guidance system 118 to identify the user 102 or to locate the user 102 within the cluster map.

At block 404, the guidance system 118 accesses a cluster map. The cluster map may be accessed from a map repository 124. Further, accessing the cluster map may include accessing a lookup table or other data structure usable to identify locations within the cluster map associated with particular users grouped within the cluster map.

At block 406, the guidance system 118 identifies a map location within the cluster map associated with the user 102. The map location may be a cluster of users that are associated with the user based at least in part on a threshold or minimal level of similarity between feature vectors or user interaction data of the user 102 and corresponding data of other users within the cluster.

Identifying the map location within the cluster map associated with the user 102 may include accessing a lookup table or other data structure to identify a location within the cluster map associated with the user 102 based at least in part on the identifier of the user obtained at the block 402. Alternatively, or in addition, identifying the map location within the cluster map associated with the user 102 may include comparing a feature vector of the user 102 with one or more feature vectors within the map location using, for example, one or more of the embodiments previously described with respect to FIG. 3.

At block 408, the guidance system 118 determines a target map location within the cluster map. The target map location may be determined based on an indication of a user of a desired result. This user may be the user 102 playing the video game 112, or it may be another user, such as an administrator, developer or publisher of the video game 112, or any other user affiliated with the video game 112. In some cases, the target map location may be a specific cluster. In other cases, the target map location may be a region or set of clusters. The target map location may be selected based in part on the current or initial map location of the user 102. For example, the guidance system 118 may select cluster 624 as a target location for a user currently associated with the cluster 620. However, for a user associated with the cluster 606, the cluster 628 may be selected as a target location. The difference in target locations may be due, for example, to a difference in play style that corresponds to a difference in the initial clusters of the user. Alternatively, the difference in target locations may be due to the selection of a more likely possible path traversal for a user. In other words, it may be easier to guide a user from one cluster to another cluster if the two clusters are similar rather than different. For example, it may be easier to guide a user that is a low-skilled melee player (e.g., uses a barbarian character that fights with an axe in a fighting game) to become a high-skilled melee player than to guide the user to become a high skilled range-based player (e.g., uses a character that fights with a bow and arrow).

In some cases, the user may not directly select the target map location but may instead identify some aspect of the user's interaction with the user 102 that the user desires to change. For example, in cases where the user 102 playing the video game 112 selects the target map location, the user may indicate a goal, such as a desire to learn a particular play style, to use a particular character type, or to improve in skill. The guidance system 118 may select the target map location based on the user's indication of the goal.

In some cases, the target location may be the same as the location identified at the block 406. For example, if it is desired that the user stays associated with a particular cluster of users (e.g., remains in a high skill level group), the target location may be the same as the current map location of the user identified at the block 406.

At block 410, the guidance system 118 determines a guidance action based at least in part on the target map location. in some cases, the guidance action may be selected based at least in part on the current map location of the user 102 as identified at the block 406. Further, in some cases the guidance action may be selected based at least in part on a combination of one or more of the following: the target map location, the current map location, user interaction data of the user 102, or a user identified goal. The guidance action may be selected using a reinforcement-learning policy. The guidance action may include any type of action, recommendation, video game 112 state change, or the like that may facilitate a change in user interaction data of the user 102. The guidance action may be selected based on the likelihood that the change in user interaction data causes a change in the cluster that the user 102 is associated with from the cluster at the map location identified at the block 406 to a cluster at the target map location. In some cases, the guidance action may be a tutorial selected to improve a skill of the user 102 with respect to a particular aspect of the video game 112. By selecting a tutorial based on characteristics of the user (e.g., the target map location, the current map location, user interaction data of the user 102, or a user identified goal), the guidance provided to the user 102 may be personalized. In some cases, the selected tutorial may be obtained from the guidance data repository 126. Alternatively, or in addition, the selected tutorial may be generated using a machine learning algorithm. The machine learning algorithm may generate the tutorial based at least in part on existing tutorials, the efficacy of the existing tutorials as determined by monitoring path traversals of users within the cluster map, the current map location of the user 102, the target map location of the user 102, and/or a combination of any of the preceding.

The tutorial may be specific to the particular circumstance of the user 102 within the video game 112 and may or may not be presented to other users that play the video game 112. For example, suppose that there is a portion of the video game 112 that requires the user to perform a series of tricky jump maneuvers including some double jumps to advance within the video game 112. If the user has demonstrated an inability to complete this portion of the video game, a tutorial may be selected to help the user 102 Learn how to perform the double jump maneuvers within the video game 112. The same tutorial may not be presented to another user that has demonstrated the ability to perform the double jump within the video game 112. Thus, embodiments of the present disclosure may generate or present personalized tutorials to users of the video game 112 based on the user's demonstrated abilities with respect to the video game 112.

Instead of, or in addition to, the tutorials, the guidance action may include changes to a state of the video game 112. For example, If the user 102 has demonstrated an inability to accomplish a particular objective within the video game 112, the guidance action may involve causing the video game 112 to present content that would facilitate the user improving in skill or improving statistics of a user controlled character to help make the particular objective more manageable for instance, changes to the video game 112 may result in particular item drops or additional quests being presented that can help the users in game character level up, which may in turn make completing the particular objective more manageable.

In some cases, the guidance action may include recommendations. For example, the guidance action may include a recommendation for the user 102 to modify play style. As another example, the guidance action may include a recommendation to complete particular quests or to interact with particular content within the video game 112.

In some cases, the guidance action is provided to a user other than the user 102 playing the video game 112. For example, the guidance action may be provided to a content developer to guide the content developer to generate content that is most likely to be of interest to the user. For instance, the guidance action may include a recommendation to develop more content that is similar to content that is likely to appeal to a cluster of users as determined based on the size of the cluster of users that have similar feature vectors. For example, if it is determined that users clustered at the map location tend to spend significant time playing city-based quests and less time playing shrine-based quests, the guidance action may include a recommendation to create more content that is similar to the city-based quests.

In some cases, the guidance actions may relate to curbing undesirable behaviors. For instance, if it is determined that there are a cluster of users that tend to harass lower-skilled players, the guidance action may include a change to the state of the video game 112 that punishes such behavior, such as by reducing in-game rewards or introducing in-game punishments that make harassment of lower-skilled players less enticing to the cluster of users that tend to harass lower-skilled players.

At block 412, the guidance system 118 executes the guidance action. Executing the guidance action may include outputting tutorials, initiating missions or quests within the video game 112, or any other action to guide the user 102. In some cases, the user 102 is aware of the personalized nature of the guidance action. In other cases, the user 102 may be unaware that the user guidance process is being performed. For example, the user 102 may be presented with a tutorial without any indication that the tutorial was prepared specifically for the user 102 based on the user's interaction with the video game 112. Thus, the user 102 may believe that the tutorial is part of standard execution of the video game 112 and that all users receive the same tutorial. As another example, the user 102 may not realize that the user is being directed to interact with particular in game features or to complete certain skill building actions in response to execution of the process 400. Instead, the user 102 may be led to believe that such guidance actions are present it to all users that interact with the video game 112. In other cases, the user 102 may be informed that particular in game actions or content are being presented to the user 102 based on adjourned termination that the user may benefit from further assistance interacting with the video game 112.

In some cases, executing the guidance action may include outputting information to a developer or other non-player user. For example, if the guidance action includes a recommendation based at least in part on a determination of where a group of users spend a particular amount of time within the video game 112, the guidance action may be presented to a developer of the video game 112.

As described above, the process 400 may be used to help guide a user interacting with the video game 112 by providing personalized tutorials, guidance, or in-game experiences that help the user to advance in skill or complete objectives. It should be understood that the process 400 may be utilized to achieve other objectives.

For example, in some cases, the process 400 may be used to make state changes to the video game 112 that adjust a difficulty of the video game 112. If the user 102 is associated with a cluster of low-skilled players who remain low-skilled for a period of time, the guidance system 118 may select a guidance action that results in a change of state variables for the video game 112 that reduces the difficulty of the video game 112. Conversely, if the user 102 is associated with a cluster of users that are advancing quickly through the video game 112, the guidance system 118 may select a guidance action that results in a change of state variables for the video game 112 that increases the difficulty of the video game 112.

Further, in some cases, the guidance action may correspond to particular content included with the video game 112 or new content that may be provided for the video game 112. This content may help guide the user in a way that improves the user's skill or that increases the likelihood that the user is entertained, which may increase retention rate. In some such cases, the block 412 may include executing the content, or causing or triggering the content to be executed at the user computing system 150 or the application host system 106 as part of executing the video game 112 or the video game 112S.

As another example, the process 400 may be used to identify pain points within the video game 112. These pain points may be identified, for example, by identifying a number (or percentage) of users that are grouped in certain clusters associated with users who find the game overly challenging (e.g., as determined by lack of advancement or retention rate), who spend more time than intended attempting certain objectives, or who cease playing the video game 112 after reaching certain content within the video game 112. Based on the determination of the pain points, a developer may make adjustments to the video game 112, or automated adjustments may be made (e.g., adjusting difficulty, adjusting world generation, adjusting item drops, etc.).

Moreover, as previously described, in some cases, the process 400 can be used to generate recommendations of the content. The recommendations may be provided to users to obtain existing content (e.g., download an expansion pack), or to users to create content (e.g., for a developer to create content of a particular type).

Example Guidance Update Process

Figure 5:
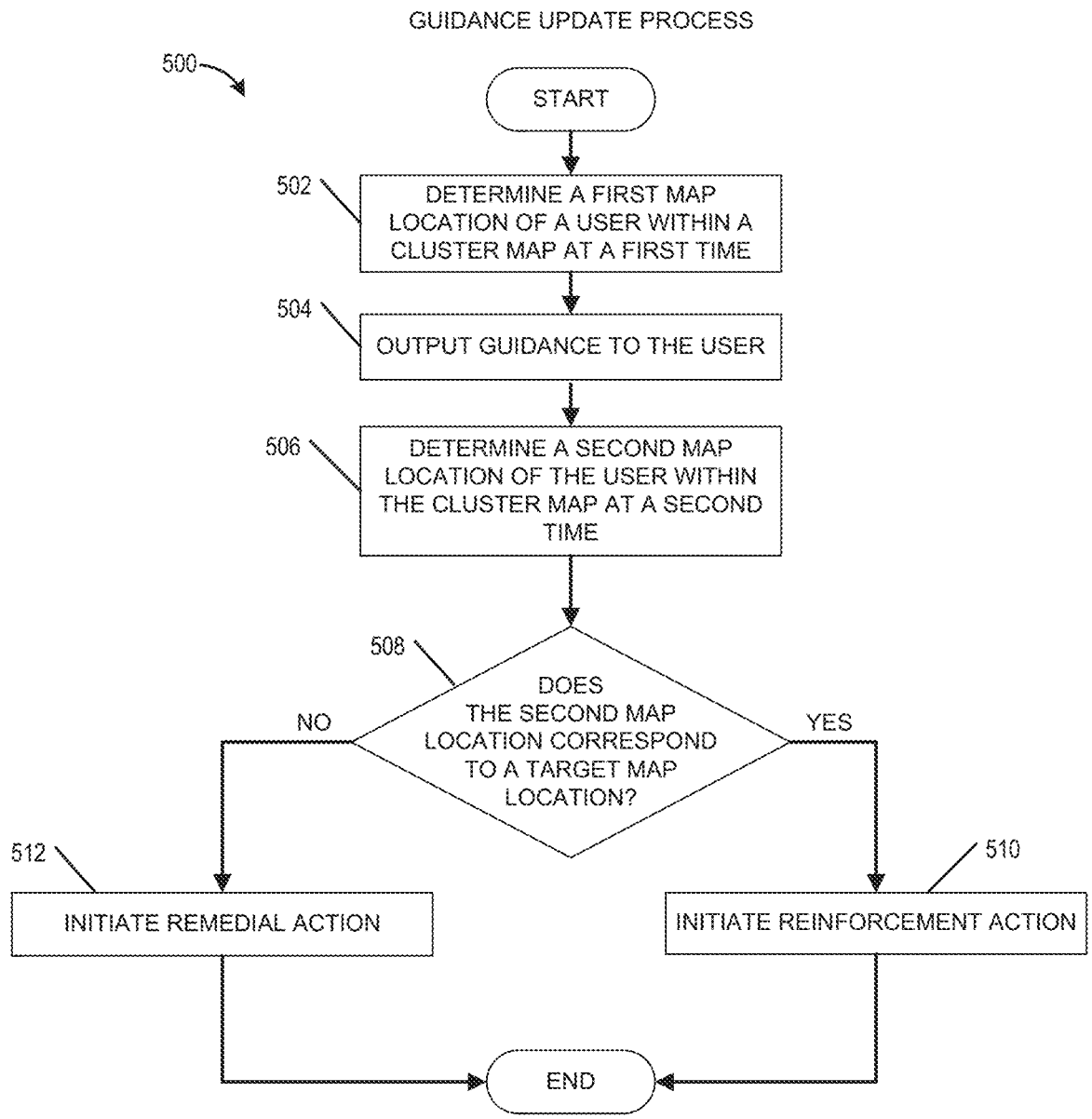
FIG. 5 presents a flowchart of an embodiment of a guidance update process in accordance with certain aspects of the present disclosure.

FIG. 5 presents a flowchart of an embodiment of a guidance update process 500 in accordance with certain aspects of the present disclosure. The process 500 can be implemented by any system that can evaluate the efficacy of guidance or a guidance action and that can update the guidance based on the determined efficacy of the guidance. The process 500, in whole or in part, can be implemented by, for example, a guidance computing system 110, a mapping system 114, a user computing system 150, an application host system 106, a tracking system 116, a guidance system 118, and the like. Although any number of systems, in whole or in part, can implement the process 500, to simplify discussion the process 500 will be described with respect to particular systems.

The process 500 may begin at block 502 where, for example, the guidance system 118 determines a first map location of a user within a cluster map at a first time. The first time may correspond to chronological or real-world time. Alternatively, or in addition, the first time may correspond to in-game time within the video game 112. In some embodiments, the block 502 may include one or more of the embodiments described with respect to the block 406.

At block 504, the guidance system 118 outputs guidance to the user 102. The guidance may correspond to a guidance action selected using, for example, the process 400. In some embodiments, the block 504 may include one or more of the embodiments described with respect to the block 410 and/or 412.

At block 506, the guidance system 118 determines a second map location of the user 102. This determination of the second map location may be at a second time. As with the first time, the second time may correspond to chronological or real-world time. Alternatively, or in addition, the second time may correspond to in-game time. Further, the second time may be selected based on a quantity of time that the user 102 spends interacting with the video game 112. For example, the second time may be associated with a minimum amount of play time that the user spends interacting with the video game 112.

The second map location may be the same as the first map location. For example, the second map location may be the same as the first map location if the guidance action is unsuccessful, if insufficient time (e.g., quantity of playtime) has passed since the guidance action executed, or if the goal of the guidance action was to maintain the user within the same cluster. The second map location may be a target map location as described with respect to the process 400, or it may be some other location within the cluster map where the user is grouped.

At decision block 508, the guidance system 118 determines whether the second map location corresponds to a target map location. In some cases, the block 508 may include determining whether the second map location is a location within the cluster map that is between the first map location and the target map location, such as another map location along a path traversal 622. For example, although it may be desirable that the second map location is the target map location, it may be acceptable in some cases for the second map location to be a map location that is leading towards the target map location along the path traversal 622. Such a determination may result in an affirmative determination at the decision block 508.

If it is determined at the decision block 508 that the second map does correspond to the target map location, the guidance system 118 initiates a reinforcement action at the block 510. The reinforcement action may include modifying (e.g., increasing) a weight associated with the guidance action. By modifying the weight associated with the guidance action, the guidance action may be more likely to be selected when a guidance action is being selected for users that are similar to the user 102. Users may be determined to be similar to the user 102 if they are determined to be grouped in the same cluster as the user 102 at the time that the user 102 received or was a beneficiary of the guidance action. In some embodiments, the block 510 may be optional or omitted. In such embodiments, the process 500 may end when it is determined that the second map corresponds to the target map location.

If it is determined at the decision block 508 that the second map does not correspond to or does not match the target map location, the guidance system 118 initiates a remedial action. The remedial action may include performing a reinforcement learning process using user interaction data and the movement of users within the clusters of the cluster map to adjust guidance provided by the guidance system 118. In some embodiments, the reinforcement-learning process or reinforcement-learning based policy may be modeled as a Markov decision process. In some embodiments, the remedial action may include modifying (e.g., decreasing) a weight associated with the guidance action. By modifying the weight associated with the guidance action, the guidance action may be less likely to be selected when a guidance action is being selected for users that are similar to the user 102.

In some cases, whether the remedial action is performed and/or the determination of the remedial action may be based not only on whether the second map location corresponds to the target map location, but also on the particular location within the cluster map of the second map location. For example, if the second map location does not satisfy the target map location but is a map location along a path traversal that leads to the target map location, the change in weight applied to the guidance action may be less than if the second map location is not along a path traversal that leads to the target map location.

Although the process 500 has been described with respect to a single user, it should be understood that the process 500 may be performed with a plurality of users. For example, the determination at the decision block 508 may be a determination of whether the second map location corresponds to the target map location for a threshold number or percentage of users. By applying the process 500 to a plurality of users, the impact of a single user who may be an outlier on the selection of guidance actions is reduced.

Example Use Cases

Figure 7:
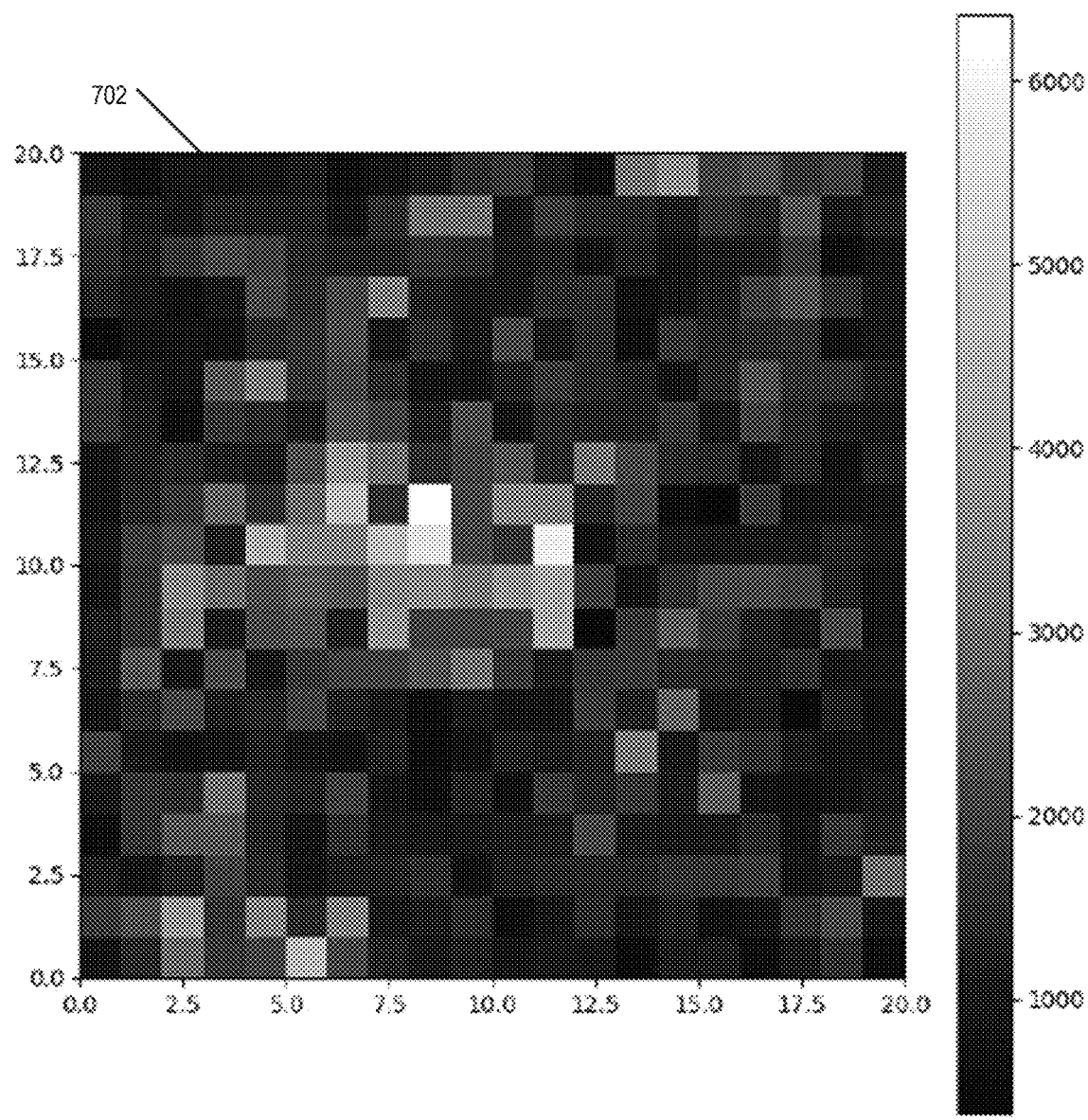
FIG. 7 illustrates an example of a cluster map generated from test data obtained from EA SPORTS® FIFA 22 in accordance with certain aspects of the present disclosure.

FIG. 7 illustrates an example of a cluster map 702 generated from test data obtained from EA SPORTS® FIFA 22 in accordance with certain aspects of the present disclosure. The cluster map 702 was generated from 128-dimensional data that was compressed to 25-dimensional space. The compressed data was then mapped to a 20×20 grid. The lighter squares within the grid represent larger clusters of users and the darker squares represent smaller clusters of users. The users may be clustered by comparing a similarity of feature vectors associated with each user. The clustering of the users may be achieved using embodiments of the process 200.

Figure 8B:
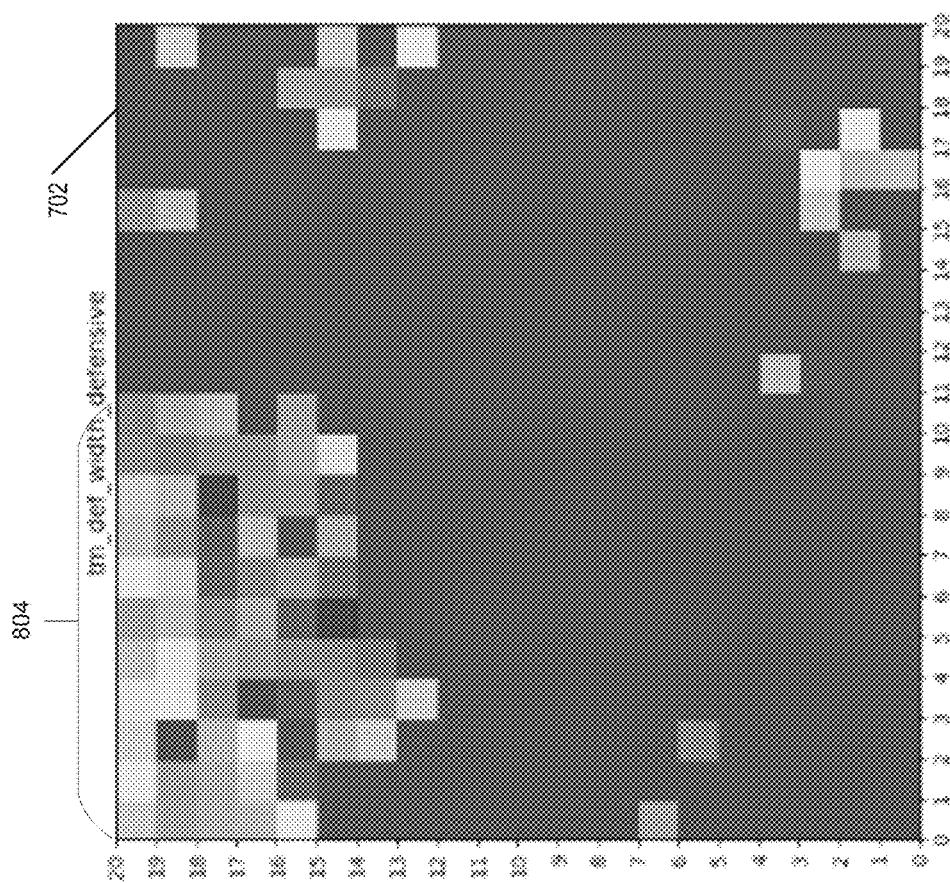
FIGS. 8A-8E illustrate an example categorization of map locations of the cluster map of FIG. 7 in accordance with certain aspects of the present disclosure.
Figure 8A:
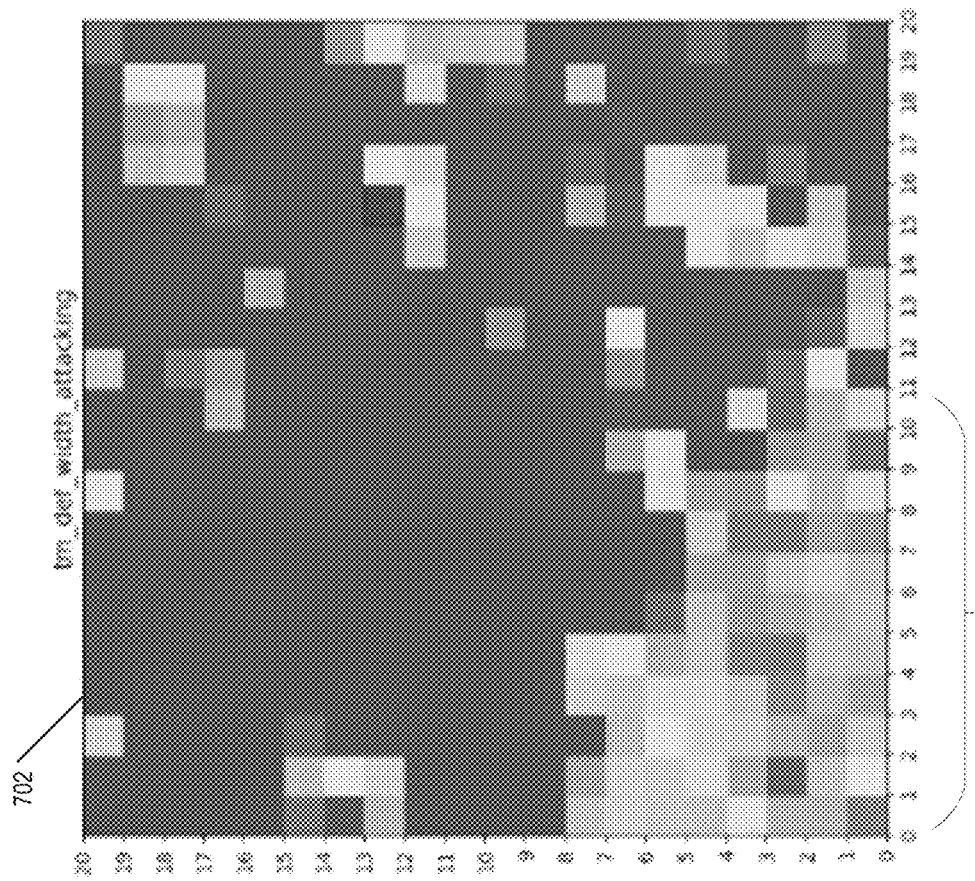
Figure 8C:
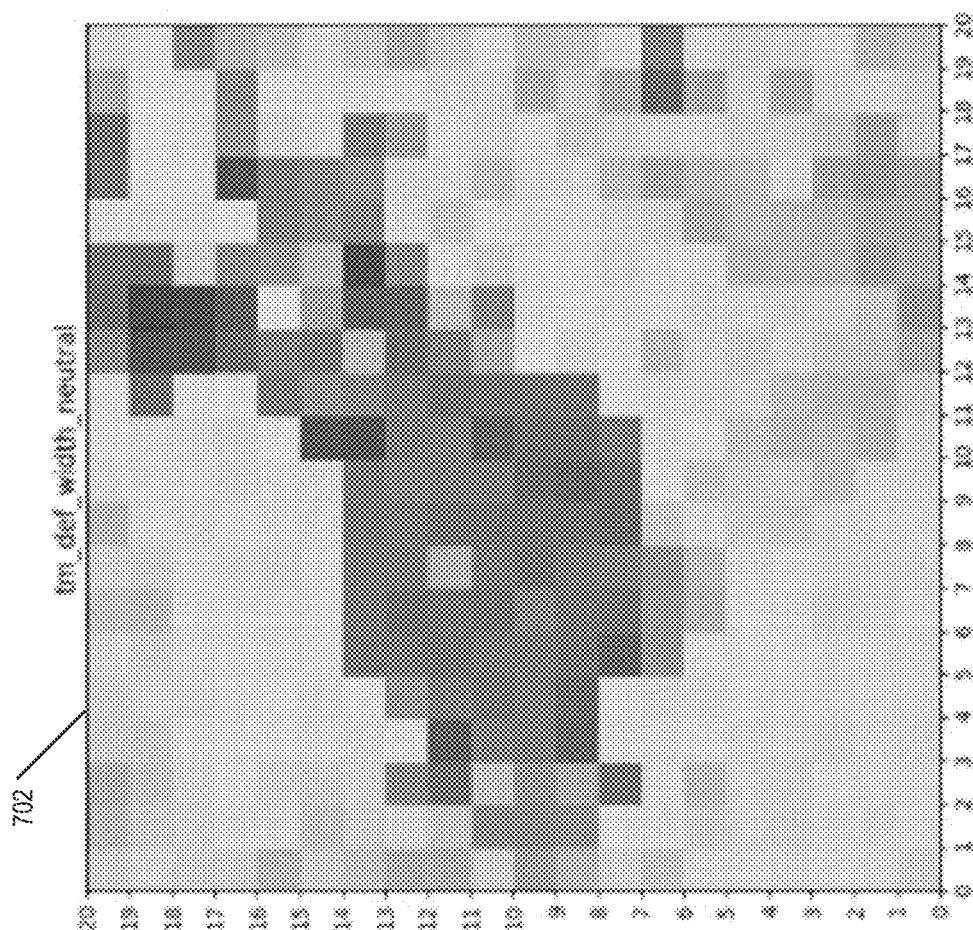
Figure 8E:
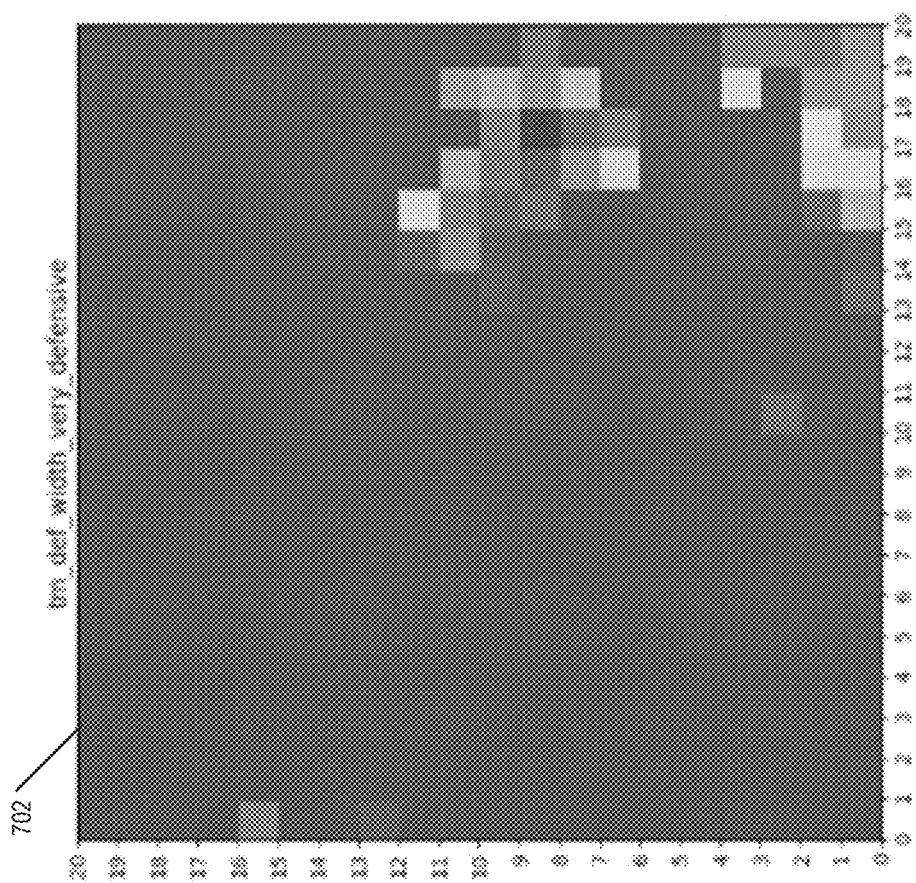
Figure 8D:
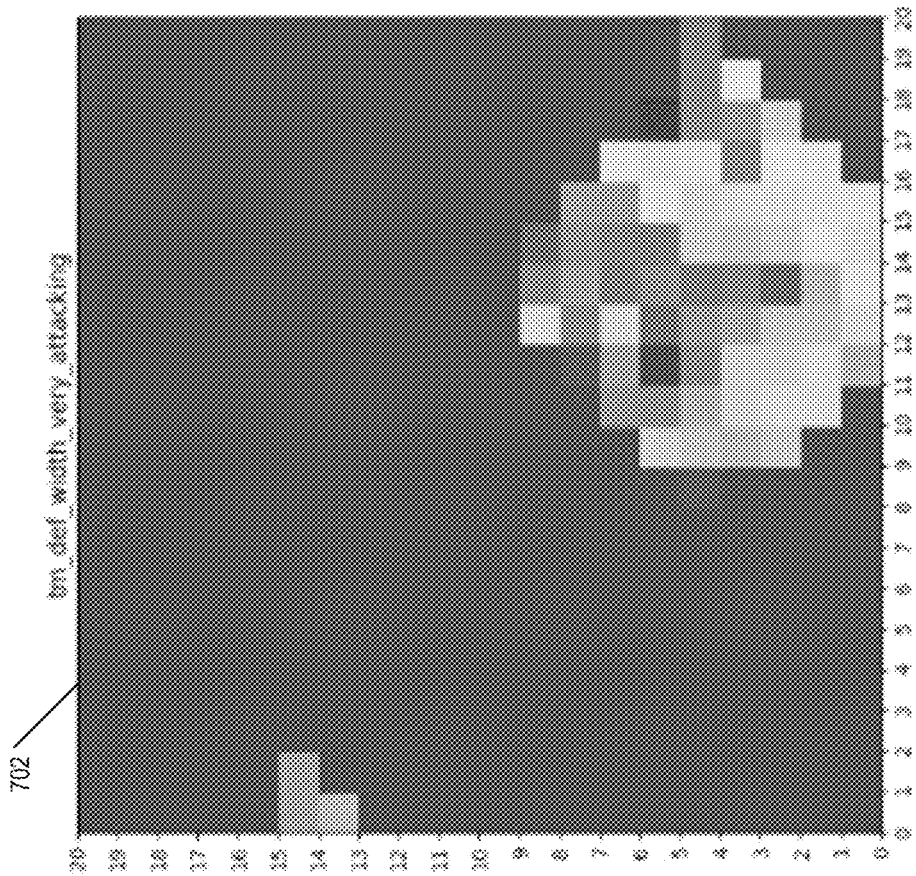

FIGS. 8A-8E illustrate an example categorization of map locations of the cluster map 702 of FIG. 7 in accordance with certain aspects of the present disclosure. The map locations (e.g., the squares representing clusters of users) may be categorized as described herein, such as with respect to the block 208 of the process 200. As previously described, clusters of users may be categorized by skill. However, as illustrated in FIGS. 8A-8E, other information may be derived from the clustering of users that may lead to alternative classifications. For example, FIGS. 8A-8E illustrate a clustering of users based on play style. FIG. 8A illustrates at the bottom left (region 802) of cluster map 702 users that play an attacking style of soccer (or football to those outside of the USA). FIG. 8B illustrates at the top left (region 804) of cluster map 702 users that play a defensive style of soccer. FIG. 8C illustrates centrally (and towards the upper right) within the cluster map 702 clusters of users that play a neutral style of soccer that does not focus specifically on attacking or defending, but that may focus equally on attacking and defending. FIG. 8D illustrates at the bottom right of the cluster map 702 clusters of players who focus on attacking to an even greater degree than the clusters of users identified in the FIG. 8A. Similarly, FIG. 8E illustrates at the right side of the cluster map 702 clusters of players who focus on defending to an even greater degree than the clusters of users identified in the FIG. 8B. It can be seen in FIGS. 8A-8E that there may be some clusters of users that share the categorizations of the users identified with respect to the FIGS. 8A-8E, but that are separated from the bulk of the clusters. This separation may be due to differences within the feature vectors. For example, with respect to FIGS. 8A and 8D, although the bulk of the attacking-focused players appears to be on the bottom half of the cluster map 702, there are a few clusters of players focusing on an attacking style that are grouped elsewhere. This distinction may be related to skill level, frequency of play, team selection, or any other factor that might distinguish certain users who focus on an attacking play style from other users.

Figures 9A, 9B, 9C:
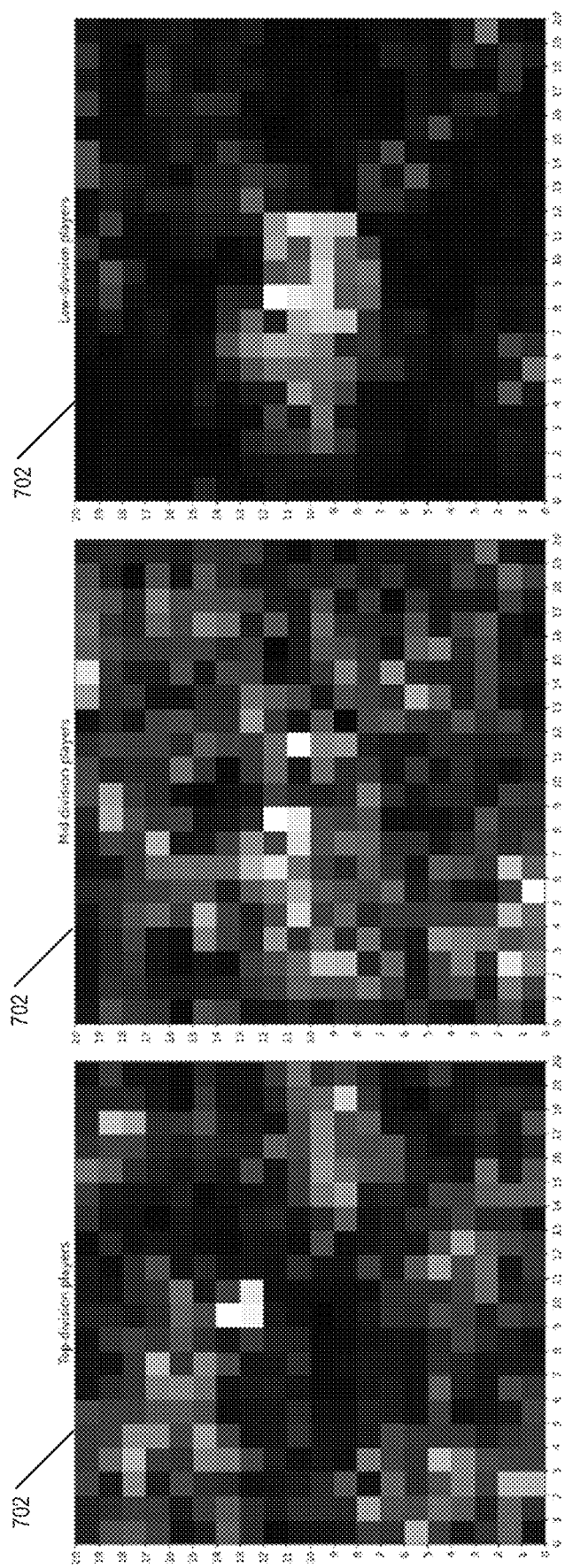
FIGS. 9A-9C illustrate a second example categorization of map locations of the cluster map of FIG. 7 in accordance with certain aspects of the present disclosure.

FIGS. 9A-9C illustrate a second example categorization of map locations of the cluster map 702 of FIG. 7 in accordance with certain aspects of the present disclosure. The same users are clustered in the cluster map 702 of FIGS. 7, 8A-8E, and 9A-9C, but the classifications of the clusters differ based on the key feature identified for classification of the clusters of users. While FIGS. 8A-8E categorized the clusters based on playstyle, FIGS. 9A-9C categorized the users based on skill.

As illustrated in FIG. 9A, the highly skilled players may be consolidated in particular regions of the cluster map 702. However, these consolidated regions, as can be seen by comparing with the playstyle categorizations of FIGS. 8A-8E, can be distributed indicating that success can be achieved regardless of playstyle. Looking at the medium skilled players highlighted in the clusters of FIG. 9B, there may be greater diversification in clustering compared to FIG. 9A. FIG. 9C illustrates low skilled players. As can be illustrated by the clustering in FIG. 9C, almost all low-skilled players can be grouped similarly. In other words, there is low variability between playstyle and other characteristics of low skilled players who play FIFA 22 based on the test data.

Figure 10:
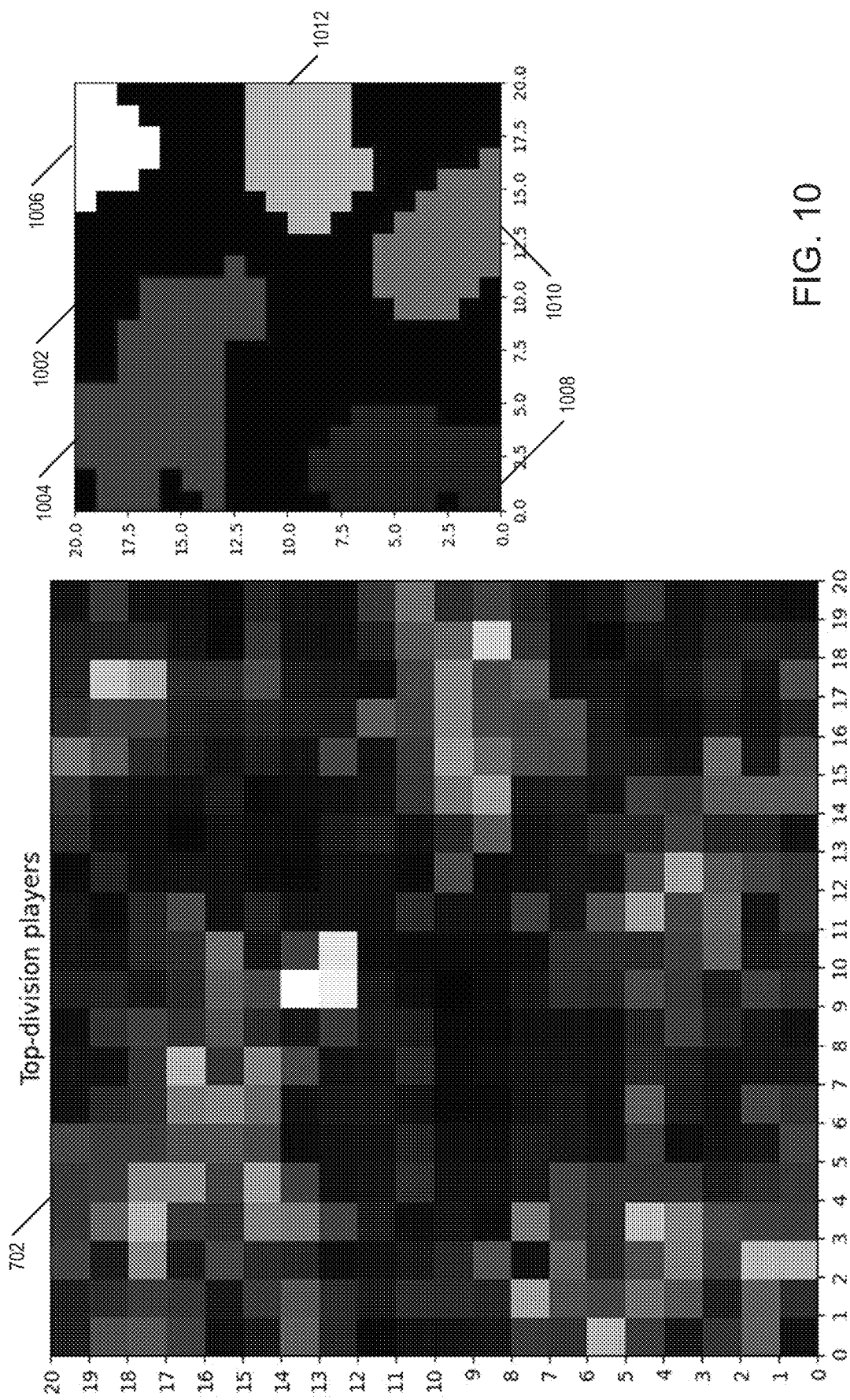
FIG. 10 illustrates an example of inferring the skills that lead to success using the cluster map of FIG. 9A in accordance with certain aspects of the present disclosure.

FIG. 10 illustrates an example of inferring the skills that lead to success using the cluster map 702 of FIG. 9A in accordance with certain aspects of the present disclosure. FIG. 10 illustrates a legend 1002 to help identify different regions associated with groupings of clusters of users who are categorized as highly skilled. The regions identified in the legend 1002 correspond to the same regions within the cluster map 702.

Region 1004 is associated with players who are defense-minded. Comparing region 1004 of the highly skilled players to region 804 of all players that focus on defense, it can be seen that there is a large overlap in clusters. The users in region 1004 tend to focus on defensive tactics. They have a lower dribble success rate when scoring and a lower amount of shooting in the box. However, these users tend to have more success passing from set-pieces and tend to use more skill-based moves.

Users in region 1006 tend to focus more on the use of directional-based tactics (e.g., trying to run around opposing players) instead of other player tactics. There appears to be less distinction among these users.

Users in region 1008 (or region 802) tend to be more attack-focused. These users are less focused on defensive tactics. Users in region 1010 are even more attack-focused than players in region 1008 relying on constant pressure, more direct passing, a large number of players in the box, and relying on offside trap tactics for defense.

Users in region 1012 play very defensively, but have little correlation with other features or playstyles.

In some embodiments, the cluster maps illustrated in FIGS. 9A-9C are separate cluster maps that are formed from a subset of users. For example, the users may be pre-categorized into skill levels. A separate cluster map may then be generated for each skill level based on feature vectors derived from user interaction data of the subject of users. These cluster maps may be used to infer other information about the users beyond skill level, such as playstyle as previously described with respect to the singular cluster map 702.

Figure 11:
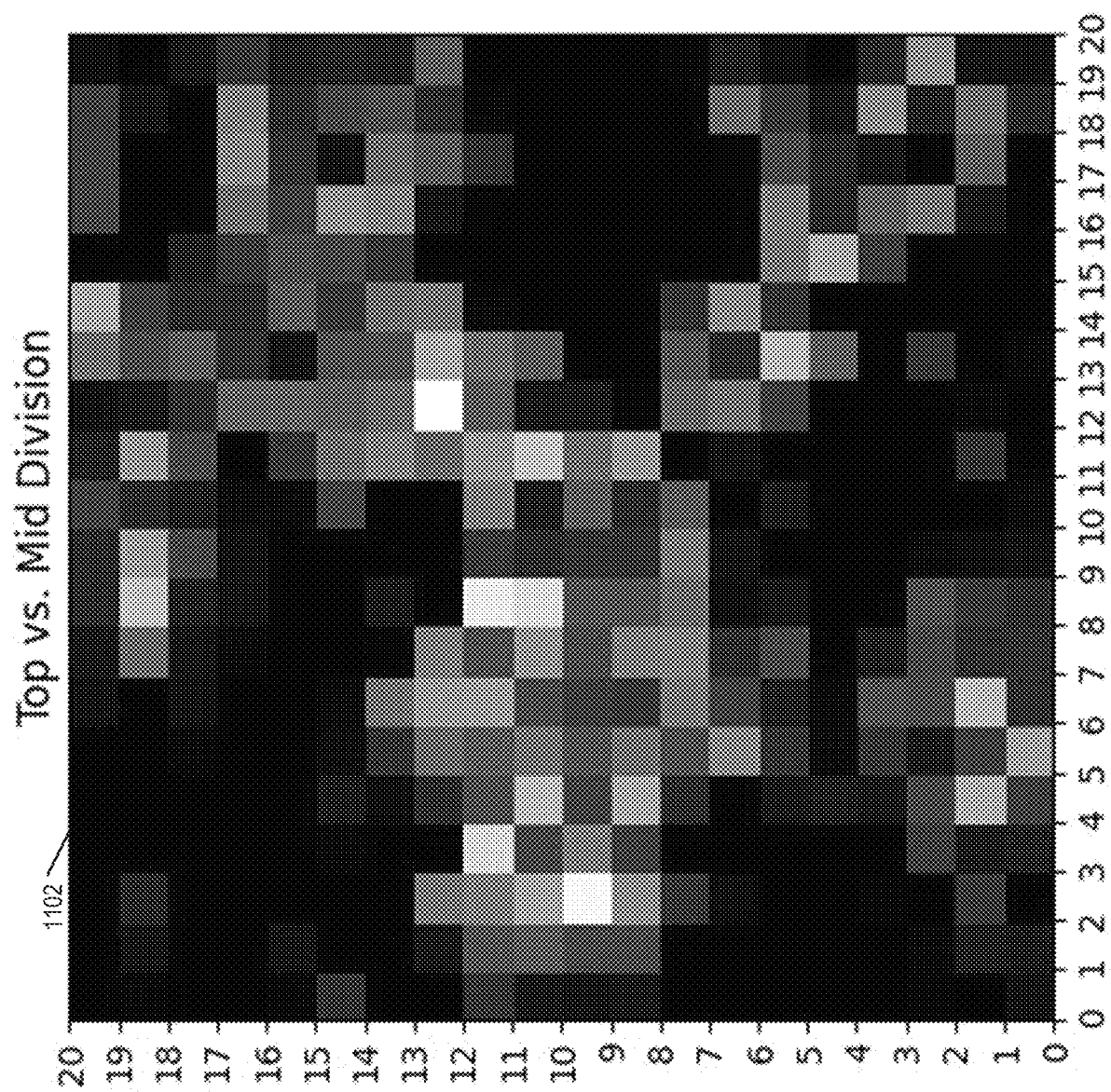
FIG. 11 illustrates an example of inferring differences between top players and less skilled players by comparing the cluster maps of FIG. 9A and FIG. 9B in accordance with certain aspects of the present disclosure.

FIG. 11 illustrates an example of inferring differences between top players and less skilled players by comparing the cluster maps of FIG. 9A and FIG. 9B in accordance with certain aspects of the present disclosure. The cluster map 1102 represents a difference between the cluster maps illustrated in FIG. 9A and FIG. 9B. This difference may be a logical difference. Further, the difference between the cluster maps may be used to help determine the difference between high skilled players and medium skilled players. By determining the difference between high and medium skilled players, guidance may be developed to help medium skilled players become high skilled players. The guidance may be developed using one or more of the embodiments previously described and may be used as part of the reinforcement learning process to help develop or adjust guidance available to move a user from one cluster to another cluster within a cluster map.

Overview of Computing System

Figure 12:
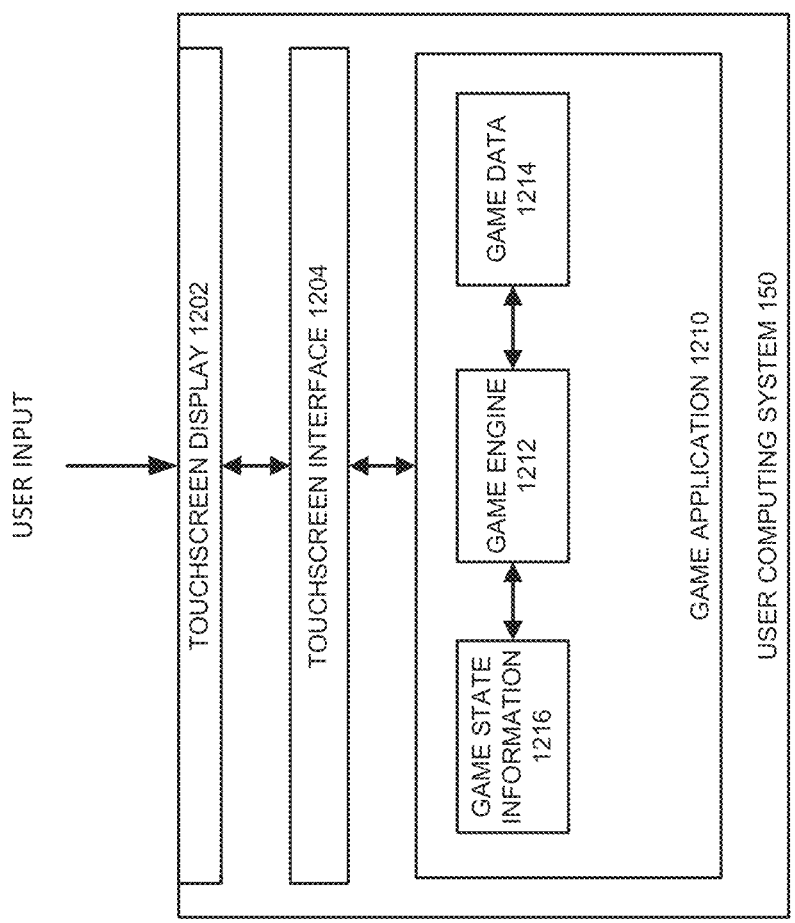
FIG. 12 illustrates an embodiment of a user computing system in accordance with certain aspects of the present disclosure.

FIG. 12 illustrates an embodiment of a user computing system 150, which may also be referred to as a gaming system. As illustrated, the user computing system 150 may be a single computing device that can include a number of elements. However, in some cases, the user computing system 150 may include multiple devices. For example, the user computing system 150 may include one device that includes that includes a central processing unit and a graphics processing unit, another device that includes a display, and another device that includes an input mechanism, such as a keyboard or mouse.

The user computing system 150 can be an embodiment of a computing system that can execute a game system. In the non-limiting example of FIG. 7, the user computing system 150 is a touch-capable computing device capable of receiving input from a user via a touchscreen display 1202. However, the user computing system 150 is not limited as such and may include non-touch capable embodiments, which do not include a touchscreen display 1202.

The user computing system 150 includes a touchscreen display 1202 and a touchscreen interface 1204, and is configured to execute a game application 1210. This game application may be the video game 112 or an application that executes in conjunction with or in support of the video game 112, such as a video game execution environment. Although described as a game application 1210, in some embodiments the game application 1210 may be another type of application that may have a variable execution state based at least in part on the preferences or capabilities of a user, such as educational software. While user computing system 150 includes the touchscreen display 1202, it is recognized that a variety of input devices may be used in addition to or in place of the touchscreen display 1202.

The user computing system 150 can include one or more processors, such as central processing units (CPUs), graphics processing units (GPUs), and accelerated processing units (APUs). Further, the user computing system 150 may include one or more data storage elements. In some embodiments, the user computing system 150 can be a specialized computing device created for the purpose of executing game applications 1210. For example, the user computing system 150 may be a video game console. The game applications 1210 executed by the user computing system 150 may be created using a particular application programming interface (API) or compiled into a particular instruction set that may be specific to the user computing system 150. In some embodiments, the user computing system 150 may be a general purpose computing device capable of executing game applications 1210 and non-game applications. For example, the user computing system 150 may be a laptop with an integrated touchscreen display or desktop computer with an external touchscreen display. Components of an example embodiment of a user computing system 150 are described in more detail with respect to FIG. 13.

The touchscreen display 1202 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 1202. The touchscreen interface 1204 can be configured to translate the touch input into data and output the data such that it can be interpreted by components of the user computing system 150, such as an operating system and the game application 1210. The touchscreen interface 1204 can translate characteristics of the tactile touch input touch into touch input data. Some example characteristics of a touch input can include, shape, size, pressure, location, direction, momentum, duration, and/or other characteristics. The touchscreen interface 1204 can be configured to determine the type of touch input, such as, for example a tap (for example, touch and release at a single location) or a swipe (for example, movement through a plurality of locations on touchscreen in a single touch input). The touchscreen interface 1204 can be configured to detect and output touch input data associated with multiple touch inputs occurring simultaneously or substantially in parallel. In some cases, the simultaneous touch inputs may include instances where a user maintains a first touch on the touchscreen display 1202 while subsequently performing a second touch on the touchscreen display 1202. The touchscreen interface 1204 can be configured to detect movement of the touch inputs. The touch input data can be transmitted to components of the user computing system 150 for processing. For example, the touch input data can be transmitted directly to the game application 1210 for processing.

In some embodiments, the touch input data can undergo processing and/or filtering by the touchscreen interface 1204, an operating system, or other components prior to being output to the game application 1210. As one example, raw touch input data can be captured from a touch input. The raw data can be filtered to remove background noise, pressure values associated with the input can be measured, and location coordinates associated with the touch input can be calculated. The type of touch input data provided to the game application 1210 can be dependent upon the specific implementation of the touchscreen interface 1204 and the particular API associated with the touchscreen interface 1204. In some embodiments, the touch input data can include location coordinates of the touch input. The touch signal data can be output at a defined frequency. Processing the touch inputs can be computed many times per second and the touch input data can be output to the game application for further processing.

A game application 1210 can be configured to be executed on the user computing system 150. The game application 1210 may also be referred to as a video game, a game, game code and/or a game program. A game application should be understood to include software code that a user computing system 150 can use to provide a game for a user to play. A game application 1210 might comprise software code that informs a user computing system 150 of processor instructions to execute, but might also include data used in the playing of the game, such as data relating to constants, images and other data structures. For example, in the illustrated embodiment, the game application includes a game engine 1212, game data 1214, and game state information 1216.

The touchscreen interface 1204 or another component of the user computing system 150, such as the operating system, can provide user input, such as touch inputs, to the game application 1210. In some embodiments, the user computing system 150 may include alternative or additional user input devices, such as a mouse, a keyboard, a camera, a game controller, and the like. A user can interact with the game application 1210 via the touchscreen interface 1204 and/or one or more of the alternative or additional user input devices. The game engine 1212 can be configured to execute aspects of the operation of the game application 1210 within the user computing system 150. Execution of aspects of gameplay within a game application can be based, at least in part, on the user input received, the game data 1214, and game state information 1216. The game data 1214 can include game rules, prerecorded motion capture poses/paths, environmental settings, constraints, animation reference curves, skeleton models, and/or other game application information. Further, the game data 1214 may include information that is used to set or adjust the difficulty of the game application 1210.

The game engine 1212 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 1210, the game application 1210 can store game state information 1216, which can include character states, environment states, scene object storage, and/or other information associated with a state of execution of the game application 1210. For example, the game state information 1216 can identify the state of the game application at a specific point in time, such as a character position, character action, game level attributes, and other information contributing to a state of the game application.

The game engine 1212 can receive the user inputs and determine in-game events, such as actions, collisions, runs, throws, attacks and other events appropriate for the game application 1210. During operation, the game engine 1212 can read in game data 1214 and game state information 1216 in order to determine the appropriate in-game events. In one example, after the game engine 1212 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 13:
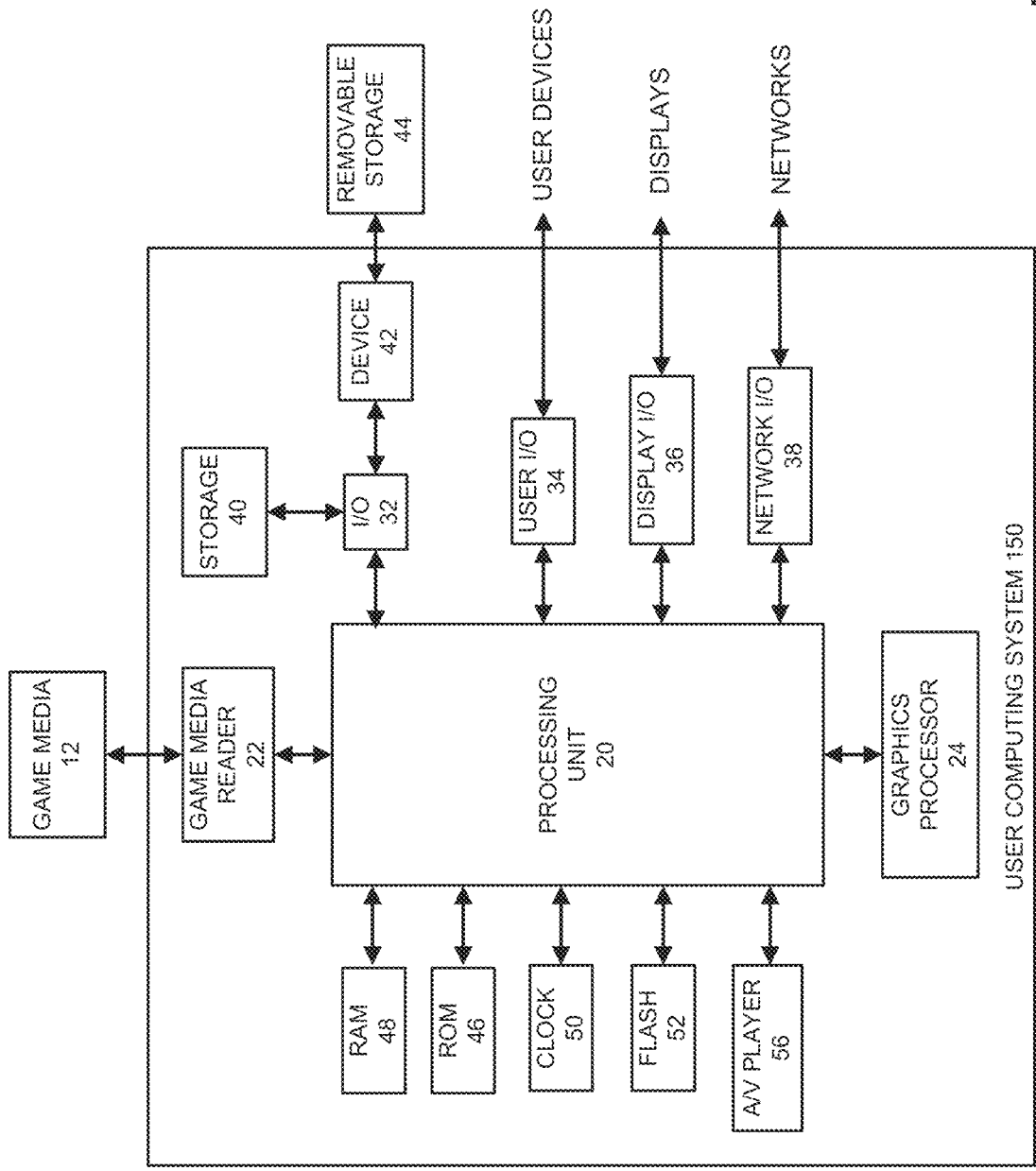
FIG. 13 illustrates an embodiment of a hardware configuration for the user computing system of FIG. 12 in accordance with certain aspects of the present disclosure.

FIG. 13 illustrates an embodiment of a hardware configuration for the user computing system 150 of FIG. 12. Other variations of the user computing system 150 may be substituted for the examples explicitly presented herein, such as removing or adding components to the user computing system 150. The user computing system 150 may include a dedicated game device, a smart phone, a tablet, a personal computer, a desktop, a laptop, a smart television, a car console display, and the like. Further, (although not explicitly illustrated in FIG. 13) as described with respect to FIG. 12, the user computing system 150 may optionally include a touchscreen display 1202 and a touchscreen interface 1204.

As shown, the user computing system 150 includes a processing unit 20 that interacts with other components of the user computing system 150 and also components external to the user computing system 150. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 150 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 150 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 150 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for user computing system 150. Processing unit 20 can communicate through I/O 32 to store data, such as game state data and any shared data files. In addition to storage 40 and removable storage media 44, user computing system 150 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 150 on a display device, such as graphics, user interfaces, video, and/or other visual content. The user computing system 150 may comprise one or more integrated displays configured to receive display output signals produced by the display I/O 36, which may be output for display to a user. According to some embodiments, display output signals produced by the display I/O 36 may also be output to one or more display devices external to the user computing system 150.

The user computing system 150 can also include other features that may be used with a game, such as a clock 50, flash memory 52, and other components. An audio/video player 56 might also be used to play a video sequence, such as a movie. It should be understood that other components may be provided in the user computing system 150 and that a person skilled in the art will appreciate other variations of the user computing system 150.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 150 is turned off or loses power.

As user computing system 150 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
    as implemented by an interactive computing system configured with specific computer-executable instructions,
        accessing a feature vector associated with a user, wherein the feature vector is extracted from a set of user interaction data associated with the user and obtained based on interaction by the user with a video game during video game play via the interactive computing system, and wherein the feature vector comprises a set of variables that store data determined from the interaction by the user with the video game;
        accessing a cluster map comprising a representation of a mapping of user clusters, wherein each location within the cluster map is associated with a set of users whose feature vectors extracted from each user's interaction with the video game during video game play are within a threshold degree of similarity of each other;
        determining a map location within the cluster map associated with the user based at least in part on the feature vector, wherein the map location represents a cluster of users whose feature vectors are within a degree of similarity of the feature vector associated with the user;
        determining a target map location within the cluster map;
        determining a guidance action based at least in part on the target map location and the map location associated with the user; and
        executing the guidance action.

2. The computer-implemented method of claim 1, wherein the cluster map comprises a self-organizing map generated by processing, using a neural network, a set of feature vectors extracted from user interaction data for a plurality of users that interact with the video game.

3. The computer-implemented method of claim 1, wherein determining the map location within the cluster map comprises comparing the feature vector with a set of features associated the map location.

4. The computer-implemented method of claim 3, wherein the set of features are determined based on a set of feature vectors associated with a set of users associated with the map location.

5. The computer-implemented method of claim 1, wherein the guidance action corresponds to an in-game tutorial, and wherein executing the guidance action comprises outputting the in-game tutorial.

6. The computer-implemented method of claim 1, wherein the guidance action corresponds to playable content of the video game, and wherein executing the guidance action comprises causing the playable content to be made available to the user.

7. The computer-implemented method of claim 6, wherein the playable content is dynamically generated.

8. The computer-implemented method of claim 1, wherein the target map location is associated with a set of features, and wherein the guidance action is determined to reduce a difference between the feature vector of the user and the set of features of the target map location over time thereby adjusting the map location associated with the user to be the target map location.

9. The computer-implemented method of claim 1, wherein the target map location and the map location associated with the user are the same, and wherein the guidance action is determined so as to maintain the user associated with the target map location.

10. The computer-implemented method of claim 1, wherein the guidance action is determined using a reinforcement-learning based policy.

11. The computer-implemented method of claim 10, wherein the guidance action is executed at a first time, and wherein, at a second time that is later than the first time, the method further comprises:
    determining a second map location within the cluster map associated with the user based at least in part on a second feature vector associated with the user;
    determining whether the second map location matches the target map location; and
    in response to determining that the second map location does not match the target map location, initiating a remedial action.

12. The computer-implemented method of claim 11, wherein the remedial action modifies the reinforcement-learning based policy.

13. The computer-implemented method of claim 1, further comprising:
    receiving an indication of a target goal associated with the video game; and
    selecting the target map location based at least in part on the target goal.

14. The computer-implemented method of claim 1, further comprising:
    extracting a set of features from a set of user interaction data associated with a plurality of users that interact with the video game;
    applying a map-based machine learning algorithm to the set of features to obtain the cluster map;
    receiving an identification of a key feature indicator; and
    categorizing clusters of users within the cluster map based at least in part on the key feature indicator.

15. The computer-implemented method of claim 14, wherein the map location is associated with a first value of the key feature indicator, wherein the first value of the key feature indicator is associated with the feature vector of the user, and wherein a second value of the key feature indicator is associated with the target map location.

16. A system comprising:
    an electronic data store configured to store a cluster map comprising a mapping of user clusters; and
    a hardware processor of an interactive computing system in communication with the electronic data store, the hardware processor configured to execute specific computer-executable instructions to at least:
        access a feature vector associated with a user, wherein the feature vector is extracted from a set of user interaction data associated with the user and obtained based on interaction by the user with a video game during video game play via the interactive computing system, and wherein the feature vector comprises a set of variables that store data determined from the interaction by the user with the video game;

access the cluster map from the electronic data store, wherein each location within the cluster map is associated with a set of users whose feature vectors extracted from each user's interaction with the video game during video game play are within a threshold degree of similarity of each other;

determine a map location within the cluster map associated with the user based at least in part on the feature vector, wherein the map location represents a cluster of users whose feature vectors are within a degree of similarity of the feature vector associated with the user;

identify a target map location within the cluster map;

select a guidance action based at least in part on the target map location and the map location associated with the user; and cause the guidance action to be executed.

17. The system of claim 16, wherein the guidance action comprises a recommendation of playable content within the video game to access, and wherein the hardware processor causes the guidance action to be executed by causing a modification to a state of the video game to trigger initiation of the playable content.

18. The system of claim 16, wherein the guidance action comprises a user-specific in-game tutorial, and wherein the hardware processor causes the guidance action to be executed by causing the video game to present the user-specific in-game tutorial to the user.

19. The system of claim 16, wherein the guidance action is selected to modify user interaction with the video game such that the association of the user with the map location changes to an association with the target map location over a time period.

20. The system of claim 16, wherein the hardware processor is further configured to execute specific computer-executable instructions to at least:

determine a second map location within the cluster map associated with the user after the user interacts with the video game for a threshold time period;

compare the second map location to the target map location; and update a guidance policy that include the guidance action based at least in part on the comparison of the second map location to the target map location.

* * * * *